United States Patent
Wang et al.

(10) Patent No.: US 11,055,620 B2
(45) Date of Patent: *Jul. 6, 2021

(54) DISTRIBUTABLE CLUSTERING MODEL TRAINING SYSTEM

(71) Applicant: SAS Institute Inc., Cary, NC (US)

(72) Inventors: Yingjian Wang, Apex, NC (US); Raymond Eugene Wright, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,041

(22) Filed: Nov. 17, 2020

(65) Prior Publication Data

US 2021/0142192 A1    May 13, 2021

Related U.S. Application Data

(63) Continuation-in-part of application No. 16/880,551, filed on May 21, 2020, now Pat. No. 10,867,253.

(60) Provisional application No. 63/077,832, filed on Sep. 14, 2020, provisional application No. 63/107,960, filed on Oct. 30, 2020, provisional application No. 63/018,476, filed on Apr. 30, 2020, provisional application No. 62/874,732, filed on Jul. 16, 2019, provisional application No. 62/852,574, filed on May
(Continued)

(51) Int. Cl.
*G06N 5/04*        (2006.01)
*G06N 20/00*       (2019.01)

(52) U.S. Cl.
CPC ............ *G06N 5/04* (2013.01); *G06N 20/00* (2019.01)

(58) Field of Classification Search
CPC ........... G06N 5/04; G06N 20/00; G06N 7/005
USPC .......................................................... 706/12
See application file for complete search history.

(56) References Cited

U.S. PATENT DOCUMENTS 10,468,136 B2 * 11/2019 Tekumalla ............. G06N 20/00
10,586,165 B1    3/2020  Wang
(Continued)

OTHER PUBLICATIONS

Zhao, "Parameter Estimation of Gaussian Mixture Model Based on Variational Bayesian Learning", IEEE 2018. (Year: 2018).*
(Continued)

*Primary Examiner* — Dave Misir
(74) *Attorney, Agent, or Firm* — Bell & Manning, LLC

(57) ABSTRACT

A computing system trains a clustering model. (A) Beta distribution parameter values are computed for each cluster using a mass parameter value and a responsibility parameter vector of each observation vector. (B) Parameter values are computed for a normal-Wishart distribution for each observation vector included in a batch of a plurality of observation vectors. (C) Each responsibility parameter vector defined for each observation vector of the batch is updated using the beta distribution parameter values, the parameter values for the normal-Wishart distribution, and a respective observation vector of the selected batch of plurality of observation vectors. (D) A convergence parameter value is computed. (E) (A) to (D) are repeated until the convergence parameter value indicates the responsibility parameter vector defined for each observation vector is converged. A cluster membership is determined for each observation vector using the responsibility parameter vector. The determined cluster membership is output for each observation vector.

30 Claims, 23 Drawing Sheets

Related U.S. Application Data 24, 2019, provisional application No. 63/018,476, filed on Apr. 30, 2020.

(56) References Cited

U.S. PATENT DOCUMENTS

| | | | |
|---|---|---|---|
| 10,628,755 B1 | 4/2020 | Wang | |
| 10,916,333 B1* | 2/2021 | Yeturu | G06F 17/153 |
| 2002/0129038 A1* | 9/2002 | Cunningham | G06F 16/30 |
| 2010/0042563 A1* | 2/2010 | Livingston | G06K 9/6226 |
| | | | 706/12 |
| 2017/0293856 A1* | 10/2017 | Bhattacharya | G06F 16/285 |

OTHER PUBLICATIONS

Vogt, "The Translation-invariant Wishart-Dirichlet Process for Clustering Distance Data", Appearing in Proceedings of the 27th International Conference on Machine Learning, Haifa, Israel, 2010. (Year: 2010).*

Nguyen, "A Scalable Hierarchical Gaussian Process Classifier", IEEE Transactions on Signal Processing, vol. 67, No. 11, Jun. 1, 2019. (Year: 2019).*

Gomes, "Incremental Learning of Nonparametric Bayesian Mixture Models", IEEE 2008. (Year: 2008).*

Blei, D. (2004). Variational inference for Dirichlet process mixtures. Journal of Bayesian Analysis, 1(1):121-143.

Wang, Y. and M. Blei, D. (2017). Frequentist Consistency of Variational Bayes. Journal of the American Statistical Association.

Huynh et al, Streaming Variational Inference for Dirichlet Process Mixtures, JMLR: Workshop and Conference Proceedings 45:237-252, 2015.

Kurihara, K., Welling, M., and Teh, Y. W. (2007). Collapsed Variational Dirichlet Process Mixture Models. In the International Joint Conference on Artificial Intelligence, 2796-2801.

Rasmussen, C. E. (1999). The Infinite Gaussian Mixture Model. In NIPS '99: Proceedings of the 12th International Conference on Neural Information Processing Systems, 554-560. Cambridge, MA: MIT Press.

Radford M. Neal, "Markov Chain Sampling Methods for Dirichlet Process Mixture Models" Journal of Computational and Graphical Statistics, vol. 9, No. 2, pp. 249-265, 2000.

SAS Visual Data Mining and Machine Learning 8.3, SAS Institute, Inc., 54 pages, 2018.

Wang, B. and Titterington, D. Convergence properties of a general algorithm for calculating variational Bayesian estimates for a normal mixture model. Bayesian Analysis 2006.

Apache MapReduce, https://www.ibm.com/analytics/hadoop/mapreduce, printed from the internet Sep. 25, 2019.

Safarinejadian, B. and Menhaj, M.B. and Karrari, M. 2010. Distributed variational Bayesian algorithms for Gaussian mixtures in sensor networks. Signal Processing 90, 4 (2010), 1197-1208.

Andrieu, C., de Freitas, N., Doucet, A., and Jordan, M. I. (2003). An Introduction to MCMC for Machine Learning. Machine Learning, 50: 5-43.

Blei, D. (2006). Variational inference for Dirichlet process mixtures. Journal of Bayesian Analysis, 1(1): 121-144.

Bishop, C. M., Pattern Recognition and Machine Learning. Information Science and Statistics. NewYork: Springer, pp. 24-28, 76-79, 102, 110-113 270. 272-278, 430-439, 474-475, 478, 690, 693, Jan. 1, 2006.

\* cited by examiner

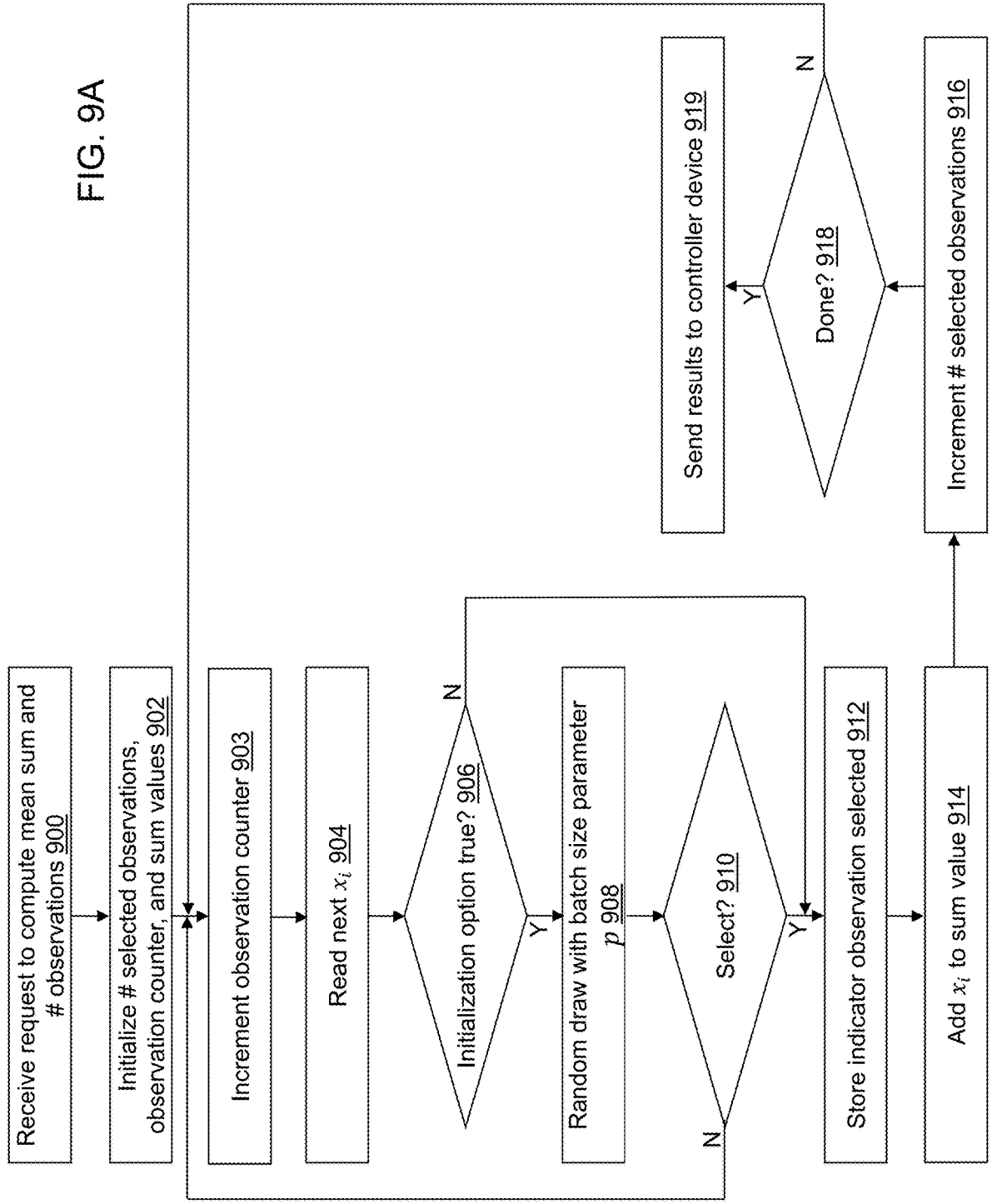

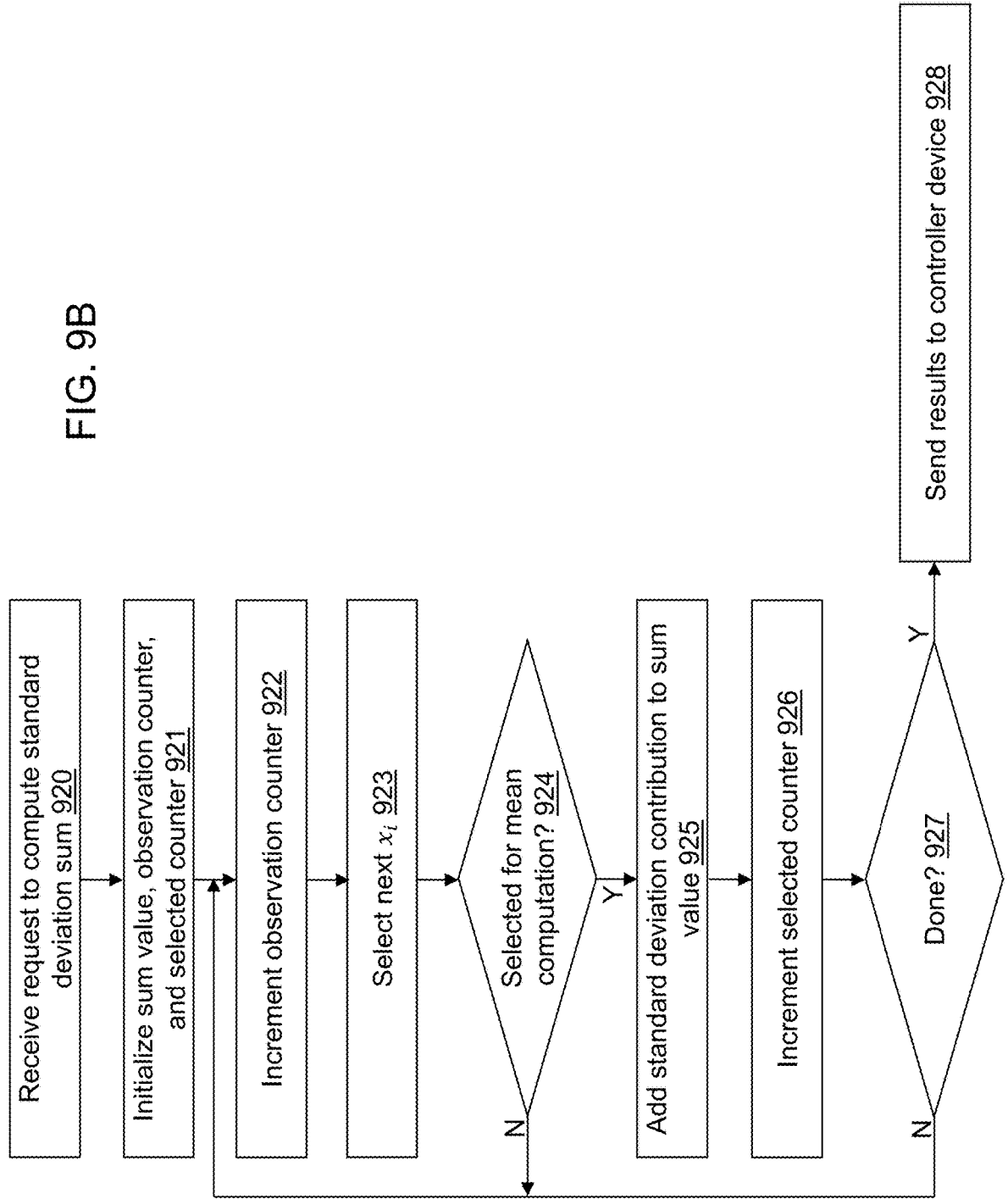

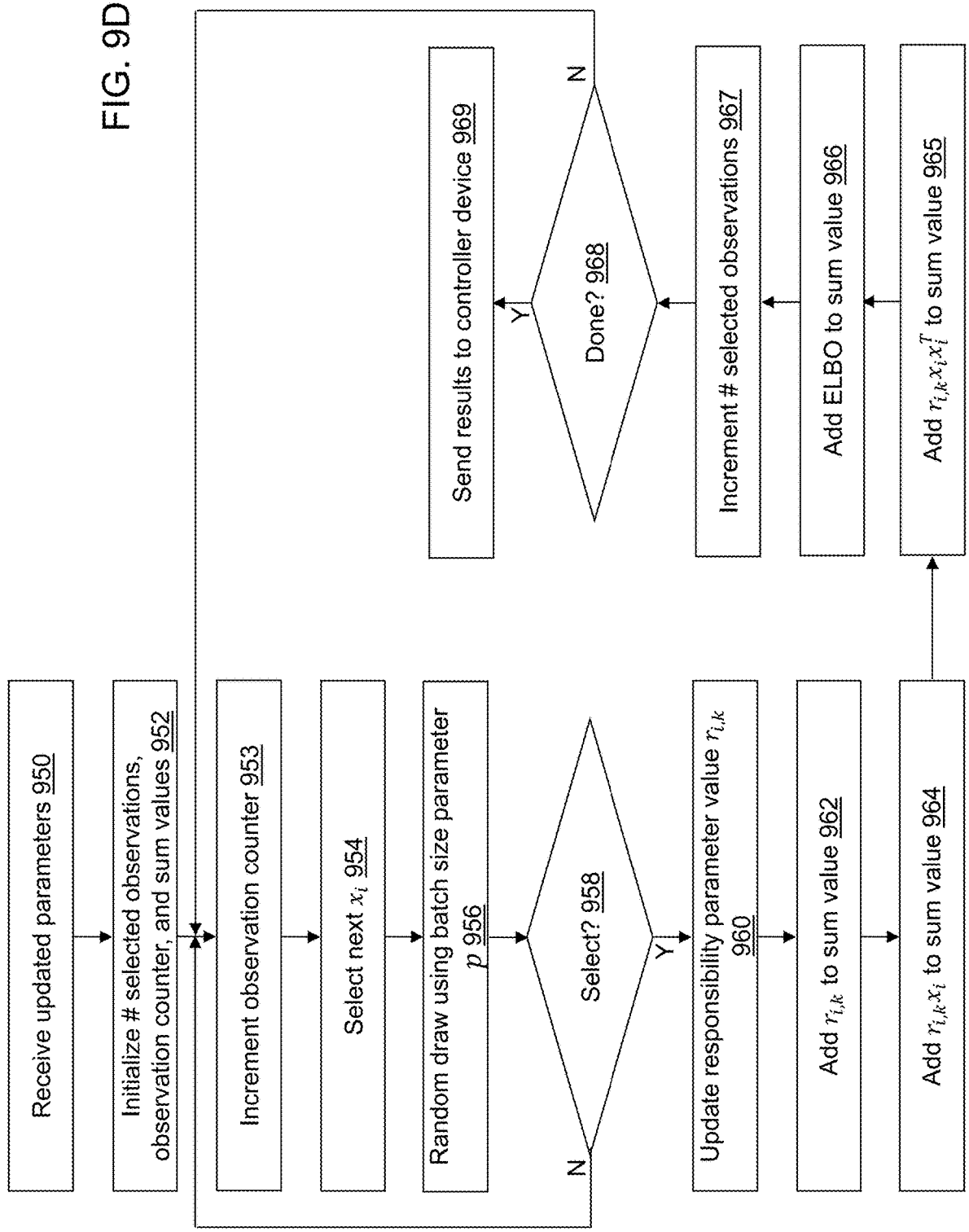

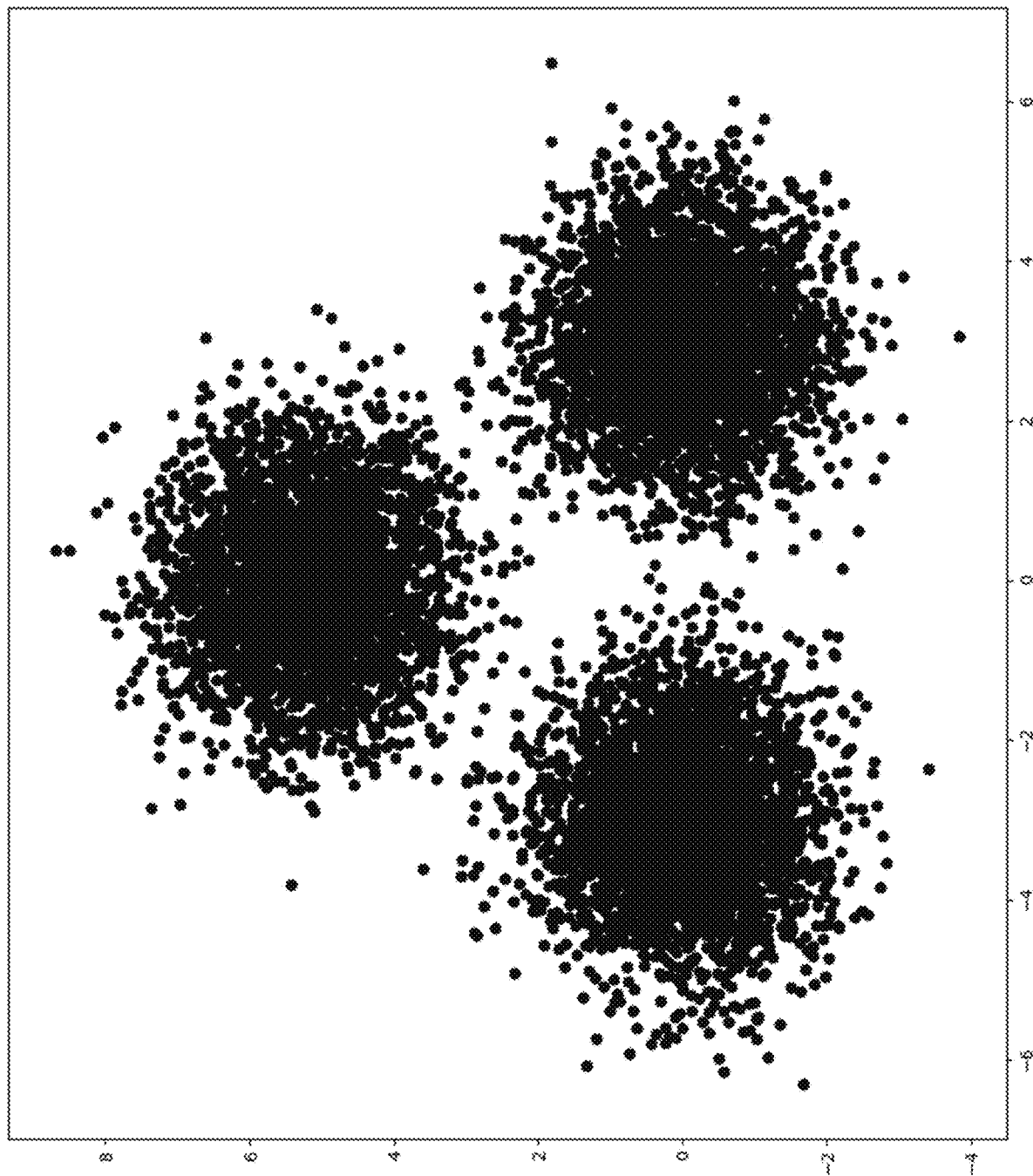

DISTRIBUTABLE CLUSTERING MODEL TRAINING SYSTEM

CROSS-REFERENCE TO RELATED APPLICATIONS

The present application claims the benefit of and priority to 35 U.S.C. § 119(e) to U.S. Provisional Patent Application No. 63/018,476 filed Apr. 30, 2020, the entire contents of which are hereby incorporated by reference. The present application also claims the benefit of and priority to 35 U.S.C. § 119(e) to U.S. Provisional Patent Application No. 63/077,832 filed Sep. 14, 2020, the entire contents of which are hereby incorporated by reference. The present application further claims the benefit of and priority to 35 U.S.C. § 119(e) to U.S. Provisional Patent Application No. 63/107,960 filed Oct. 30, 2020, the entire contents of which are hereby incorporated by reference.

The present application is also a continuation-in-part of U.S. patent application Ser. No. 16/880,551 that was filed May 21, 2020, the entire contents of which are hereby incorporated by reference. U.S. patent application Ser. No. 16/880,551 claimed the benefit of and priority to 35 U.S.C. § 119(e) to U.S. Provisional Patent Application No. 63/018,476 filed Apr. 30, 2020, the entire contents of which are hereby incorporated by reference. U.S. patent application Ser. No. 16/880,551 also claimed the benefit of and priority to 35 U.S.C. § 119(e) to U.S. Provisional Patent Application No. 62/852,574 filed May 24, 2019, the entire contents of which are hereby incorporated by reference. U.S. patent application Ser. No. 16/880,551 further claimed the benefit of and priority to 35 U.S.C. § 119(e) to U.S. Provisional Patent Application No. 62/874,732 filed Jul. 16, 2019, the entire contents of which are hereby incorporated by reference.

BACKGROUND

Clustering is a commonly used machine learning model used to analyze a wide range of types of data that includes text data, image data, biological data, geographic data, etc. The Dirichlet process Gaussian mixture model (DPGMM) is a widely used nonparametric Bayesian model for clustering tasks in machine learning. The nonparametric feature in DPGMM is to use the Dirichlet process to support unknown components in the mixture which corresponds to the number of clusters in data rendering DPGMM a desirable tool in clustering for its efficacy and elegancy. However, due to its high modeling complexity, DPGMM has rarely been applied to cluster with relatively big datasets, e.g., datasets with more than a million of observations, due to the prohibitive clustering time incurred.

SUMMARY

In an example embodiment, a computer-readable medium is provided having stored thereon computer-readable instructions that when executed by a computing device, cause the computing device to train a clustering model. A mean vector is computed from a plurality of observation vectors. Each observation vector of the plurality of observation vectors includes a value for each variable of a plurality of variables. An inverse precision matrix is computed from the plurality of observation vectors. A responsibility parameter vector is initialized for each observation vector of the plurality of observation vectors. The responsibility parameter vector includes a probability value of a cluster membership in each cluster of a plurality of clusters for each respective observation vector of the plurality of observation vectors. (A) Beta distribution parameter values are computed for each cluster using a predefined mass parameter value and the responsibility parameter vector for each observation vector of the plurality of observation vectors. (B) Parameter values are computed for a normal-Wishart distribution using a predefined concentration parameter value, a predefined degree of freedom parameter value, the computed mean vector, the computed inverse precision matrix, a batch of the plurality of observation vectors, and the responsibility parameter vector defined for each observation vector included in the batch of the plurality of observation vectors. (C) Each responsibility parameter vector defined for each observation vector of the batch of plurality of observation vectors is updated using the computed beta distribution parameter values, the computed parameter values for the normal-Wishart distribution, and a respective observation vector of the selected batch of plurality of observation vectors. (D) A convergence parameter value is computed. (E) (A) to (D) are repeated until the computed convergence parameter value indicates the responsibility parameter vector defined for each observation vector is converged. A cluster membership is determined for each observation vector using a respective, updated responsibility parameter vector. The determined cluster membership is output for each observation vector.

In another example embodiment, a system is provided. The system includes, but is not limited to, a processor and a computer-readable medium operably coupled to the processor. The computer-readable medium has instructions stored thereon that, when executed by the processor, cause the system to train a clustering model.

In yet another example embodiment, a method of training a clustering model is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 9A, 9B, 9C, 9D, and 9E depict flow diagrams illustrating examples of operations performed by the worker device of FIG. 6 in accordance with an illustrative embodiment.

FIG. 10A shows a first sample dataset with three clusters in accordance with an illustrative embodiment.

DETAILED DESCRIPTION

Figure 1:
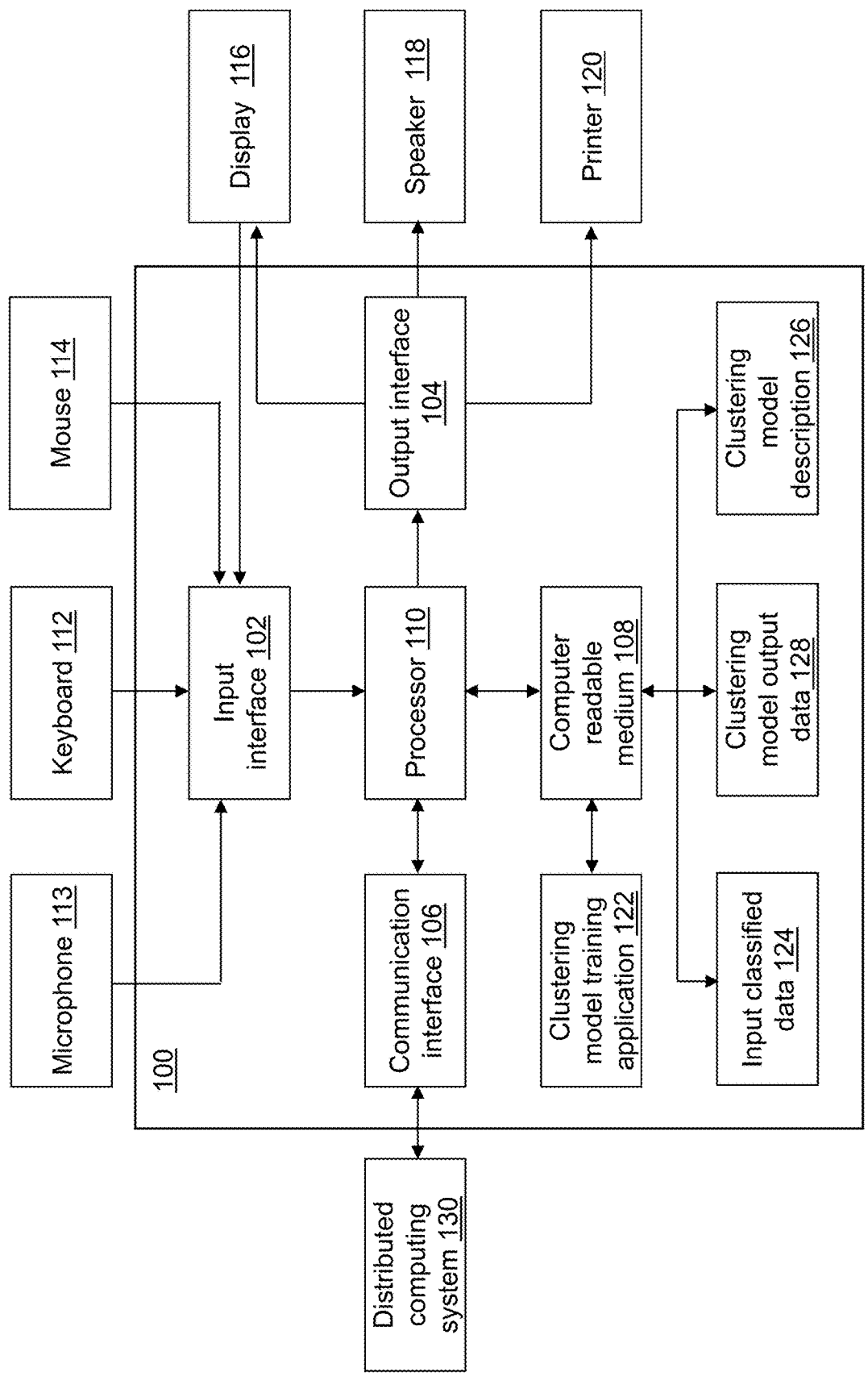
FIG. 1 depicts a block diagram of a clustering model training device in accordance with an illustrative embodiment.

In Dirichlet process Gaussian mixture model (DPGMM), each cluster is represented by a mean or center location and a covariance matrix of a Gaussian distribution that defines a shape of each cluster. Use of a Gaussian distribution is justified by the central limit theorem that states any data made up with a large number of underlying features will be distributed as a Gaussian. The Gaussian mixture model can be regarded as an extension of a k-means clustering model with the additional information of the correlations within each cluster defined by the covariance matrices. The function of the Dirichlet process (DP) in DPGMM is to find a number of clusters in the data. The mathematic expression of the DPGMM is given in equation (1).

$$p(\{\mu_k, \Lambda_k\}_{k=1}^{K_{max}} | x, z) \propto \Pi_{i=1}^{n} N(x_i | \mu_{z_i}, \Lambda_{z_i}) \Pi_{k=1}^{K_{max}} NW(\mu_k, \Lambda_k | m_0, \beta_0, \Psi_0, \nu_0) \quad (1)$$

$x = \{x_i\}_{i=1}^{n}$, n input observations;
$z = \{z_i\}_{i=1}^{n}$, a cluster index where $z_i = 1, 2, \ldots, K_{max}$;
K, a number of clusters in x;
$\mu_k$, a mean of Gaussian distribution, where $k = 1, 2, \ldots, K_{max}$;
$\Lambda_k$, a covariance of the Gaussian distribution, where $k = 1, 2, \ldots, K_{max}$;
$x_i$, the $i^{th}$ data;
$z_i$, the cluster membership of the $i^{th}$ data;
$\mu_{z_i}$, a mean of the cluster of the $i^{th}$ data;
$\Lambda_{z_i}$, a covariance of the cluster of the $i^{th}$ data;
$m_0, \beta_0, \Psi_0, \nu_0$, the parameters of the normal-Wishart distribution prior;

$N(\cdot)$, a Gaussian distribution;
$NW(\cdot)$, a normal-Wishart distribution.

For DPGMM, the parameters to be inferred are the number of clusters K, the cluster membership for all observations $\{z_i\}_{i=1}^{n}$, and the Gaussian parameters of the clusters $\{\mu_k, \Lambda_k\}_{k=1}^{K_{max}}$. There are two major methods for the inference of DPGMM: 1) the Markov chain Monte Carlo (MCMC) and 2) the variational Bayesian (VB).

MCMC is a class of methods to infer a complicated probability distribution via sampling. The strategy is to form a Markov chain whose equilibrium distribution is the probability distribution whose parameters are to be inferred. After the proposed Markov chain achieve its equilibrium, the samples drawn from the conditional distribution of the Markov chain are regarded as samples from the target distribution. Hence these samples can be used to calculate the needed parameters. More details about the MCMC method can be found in Andrieu, C., de Freitas, N., Doucet, A., and Jordan, M. I., *An Introduction to MCMC for Machine Learning* Machine Learning 50: 5-43 (2003).

For DPGMM, MCMC is the most common inference method for two major reasons. First, the implementation of MCMC is relatively easy with the sampling steps usually derived in a straightforward manner from the target distribution. Second, the MCMC is guaranteed to yield unbiased results relative to the true distribution by the central limit theorem. Because of these merits of MCMC, there is a series of works on the sampling inference for DPGMM. However, the Markov chain in MCMC usually involves a large number of iterations to reach equilibrium making it computationally time expensive. Additionally, the Markov chain is a strict serial process making it difficult to parallelize with distributed data on multiple machines, especially when processing big data. Recently some parallel algorithms have been developed to run MCMC independently on each machine and synthesize all of the samples into the full distribution. However, when it used for clustering, a cluster alignment procedure is required to unite the separate clustering results into one, which can introduce significant mixing errors.

In contrast with MCMC, VB inference has been inadequately investigated largely because VB is an approximation method. Nevertheless, VB inference has advantages over MCMC. First, VB inference typically takes significantly fewer iterations resulting in a much faster convergence. Second, VB inference does not require a strict serial implementation and is more compatible with a distributed data environment. Third, VB shows clear asymptotic properties even though the result is approximated by a Kullback-Leibler distance relative to the true target distribution.

Detailed discussion on VB methods can be found in Wang, Y. and M. Blei, D., *Frequentist Consistency of Variational Bayes*, Journal of the American Statistical Association (2017). Generally speaking, in VB inference, the task to calculate the target distribution is an optimization problem with the goal of finding a candidate distribution $q(\theta)$ that is closest to a true target distribution $p(\theta|x)$ as shown in equation (2).

$$q^*(\theta) = \underset{q(\theta) \in M}{\mathrm{argmin}} KL(q(\theta) \| p(\theta | x)) \quad (2)$$

$$KL(q(\theta) \| p(\theta | x)) =$$

$$\log p(x) + KL(q(\theta) \| p(x, \theta)) = \log p(x) - ELBO(q(\theta))$$

where ELBO is the evidence lower bound.

In practice, the DP is implemented with a stick-breaking construction, but truncated at a sufficiently large $K_{max}$ based on an understanding about the upper bound of the number of clusters among the data and/or a capacity limit of the hardware. The VB model for DPGMM, $p(\theta|x)$, is defined in equation (3) with $p(\theta)$:

$\phi_k \sim \text{Beta}(1,\alpha_0)$ $\pi_k = \phi_k \Pi_{l=1}^{k-1}(1-\phi_l)$ $\mu_k, \Lambda_k \sim NW(m_0, \beta_0, \Psi_0, v_0), k=1,2,\ldots,K_{max}$ $z_i \sim \text{multinomial}(\pi)$ $x_i \sim N(\mu_{z_i}, \Lambda_{z_i}^{-1}), i=1,2,\ldots,n$ (3)

$\theta$, clustering parameters to be inferred: $K_{max}$, $\mu_k$, $\Lambda_k$,
$\alpha_0$, a mass parameter of the DP,
$\phi_k$, a beta variable for the stick-breaking,
$\pi_k$, a fraction of the $k^{th}$ cluster.

The variational distribution, $q(\theta)$, is defined in equation (4).

$q(\theta)$:

$\phi_k \sim \text{Beta}(\gamma_{k,1}, \gamma_{k,2})$ $\mu k, \Lambda_k \sim NW(m_k, \beta_k, \Psi_k, v_k), k=K_{max}$ $z_i \sim \text{multinomial}(r_i), i=1,2,\ldots,n$ (4)

$\gamma_{k,1}$, $\gamma_{k,2}$, parameters of the beta distribution of the $k^{th}$ fraction of stick-breaking, $m_k$, $\beta_k$, $\Psi_k$, $v_k$, parameters of the normal-Wishart distribution of the $k^{th}$ cluster, $r_i$: a responsibility vector over the $K_{max}$ clusters of the $i^{th}$ data.

Stochastic variational bayesian (SVB) inference can further be used to greatly improve processing speed with a small loss in clustering accuracy. In SVB, instead of using all of the data in the dataset, only a small randomly chosen subset of the data (or a 'mini-batch') is used to compute and update the statistics each iteration resulting in a great improvement in speed. Because of the stochastic selection of the subset each iteration, the loss in accuracy is small.

Further, instead of using a fully separated mixture model, a mixture model whose mixture covariance is drawn from a common Wishart distribution can be used. Doing so assumes that the shapes of the clusters, which are represented by the Gaussian covariances, are similar to each other or are the same for a given dataset. The assumption is true for many real-world datasets. Such a "linked model" mixture model uses the common covariance for the clusters and can capture the data distributions more accurately with lower computation cost.

Referring to FIG. 1, a block diagram of a clustering model training device 100 is shown in accordance with an illustrative embodiment that clusters data using the DPGMM optionally with the SVB inference method and/or assuming the common Wishart distribution. Clustering model training device 100 may include an input interface 102, an output interface 104, a communication interface 106, a non-transitory computer-readable medium 108, a processor 110, a clustering model training application 122, input dataset 124, a clustering model description 126, and clustering model output data 128. Fewer, different, and/or additional components may be incorporated into clustering model training device 100.

Input interface 102 provides an interface for receiving information from the user or another device for entry into clustering model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into clustering model training device 100 or to make selections presented in a user interface displayed on display 116.

The same interface may support both input interface 102 and output interface 104. For example, display 116 comprising a touch screen provides a mechanism for user input and for presentation of output to the user. Clustering model training device 100 may have one or more input interfaces that use the same or a different input interface technology. The input interface technology further may be accessible by clustering model training device 100 through communication interface 106.

Output interface 104 provides an interface for outputting information for review by a user of clustering model training device 100 and/or for use by another application or device. For example, output interface 104 may interface with various output technologies including, but not limited to, display 116, a speaker 118, a printer 120, etc. Clustering model training device 100 may have one or more output interfaces that use the same or a different output interface technology. The output interface technology further may be accessible by clustering model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Clustering model training device 100 may have one or more communication interfaces that use the same or a different communication interface technology. For example, clustering model training device 100 may support communication using an Ethernet port, a Bluetooth antenna, a telephone jack, a USB port, etc. Data and/or messages may be transferred between clustering model training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Clustering model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Clustering model training device 100 also may have one or more drives that support the loading of a memory media such as a CD, DVD, an external hard drive, etc. One or more external hard drives further may be connected to clustering model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Clustering model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Clustering model training application 122 performs operations associated with defining clustering model description 126 from data stored in input dataset 124. Clustering model description 126 may be used to predict a cluster membership for data stored input dataset 124 or in a second dataset 1324 (shown referring to FIG. 13). Some or all of the operations described herein may be embodied in clustering model training application 122. The operations may be implemented using hardware, firmware, software, or any combination of these methods.

Referring to the example embodiment of FIG. 1, clustering model training application 122 is implemented in software (comprised of computer-readable and/or computer-executable instructions) stored in computer-readable medium 108 and accessible by processor 110 for execution of the instructions that embody the operations of clustering model training application 122. Clustering model training application 122 may be written using one or more programming languages, assembly languages, scripting languages, etc. Clustering model training application 122 may be integrated with other analytic tools. As an example, clustering model training application 122 may be part of an integrated data analytics software application and/or software architecture such as that offered by SAS Institute Inc. of Cary, N.C., USA. Merely for illustration, clustering model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Clustering model training application 122 may be implemented as a Web application. For example, clustering model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables define a vector $x_i$ for each observation vector i=1, 2, . . . , n, where n is a number of the observation vectors included in input dataset 124. Input dataset 124 may include additional variables that are not included in the plurality of variables. One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to clustering model training device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 130 and accessed by clustering model training device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on clustering model training device 100 or on distributed computing system 130. Clustering model training device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
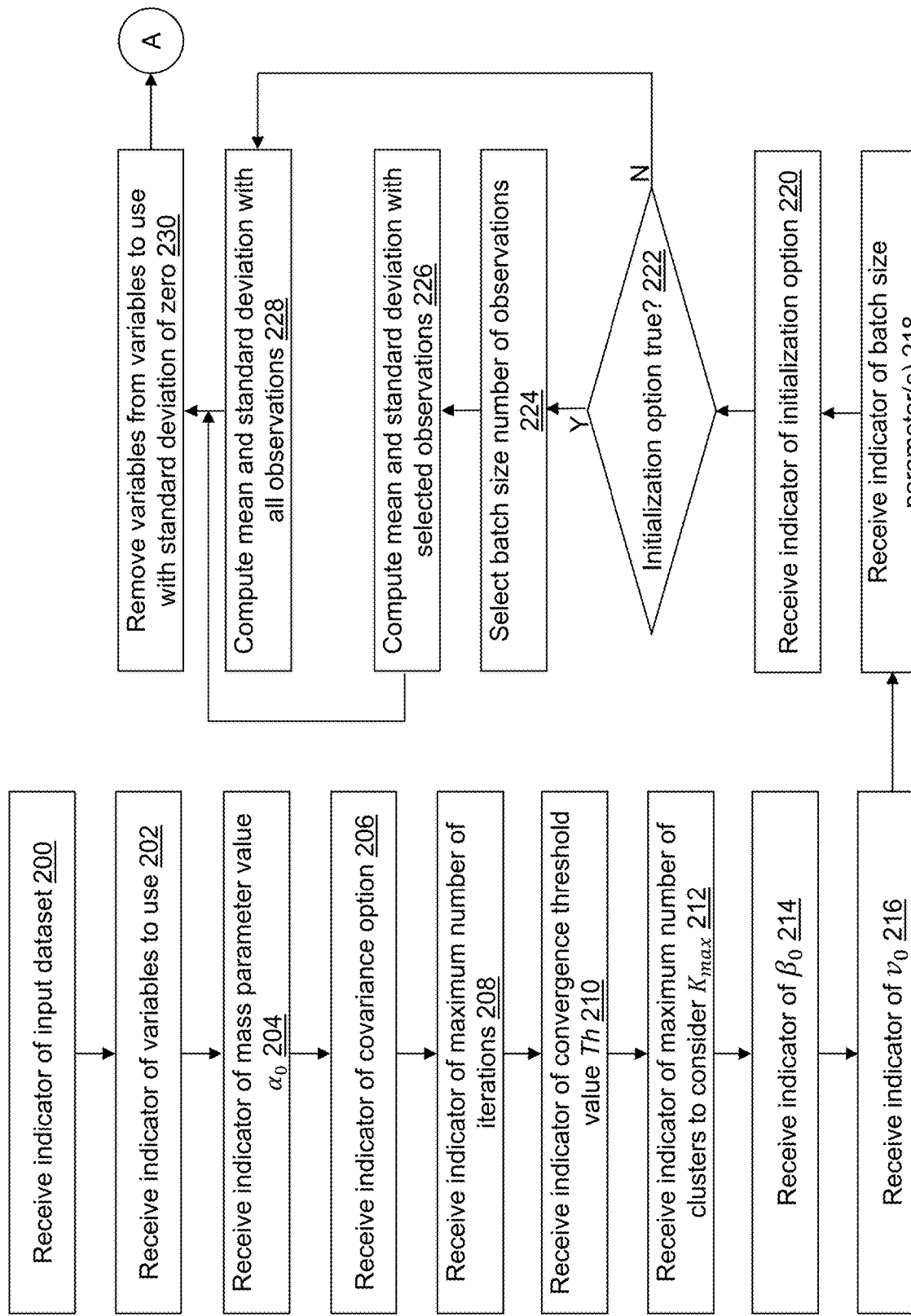
FIGS. 2A and 2B depict a flow diagram illustrating examples of operations performed by a clustering model training application of the clustering model training device of FIG. 1 in accordance with an illustrative embodiment.
Figure 2B:
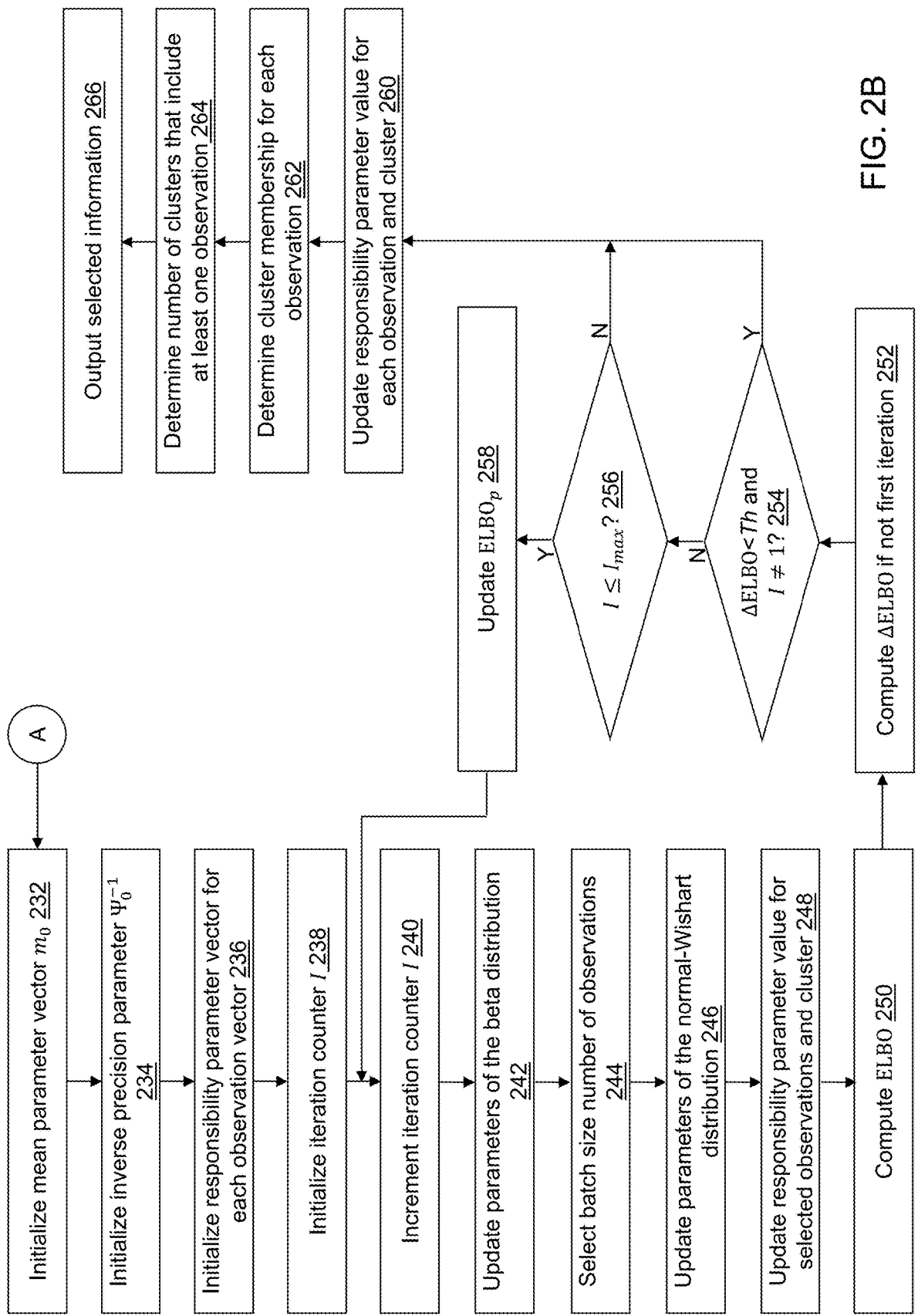

Referring to FIGS. 2A and 2B, example operations associated with clustering model training application 122 are described when input dataset 124 is stored on clustering model training device 100. Additional, fewer, or different operations may be performed depending on the embodiment of clustering model training application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute clustering model training application 122, which causes presentation of a first user interface window, which may include a plurality of menus and selectors such as drop-down menus, buttons, text boxes, hyperlinks, etc. associated with clustering model training application 122 as understood by a person of skill in the art. The plurality of menus and selectors may be accessed in various orders. An indicator may indicate one or more user trainings from a user interface, one or more data entries into a data field of the user interface, one or more data items read from computer-readable medium 108 or otherwise defined with one or more default values, etc. that are received as an input by clustering model training application 122.

Referring to FIG. 2A, in an operation 200, a first indicator may be received that indicates input dataset 124. For example, the first indicator indicates a location and a name of input dataset 124. As an example, the first indicator may be received by clustering model training application 122 after selection from a user interface window or after entry by a user into a user interface window. In an alternative embodiment, input dataset 124 may not be selectable. For example, a most recently created dataset may be used automatically.

In an operation 202, a second indicator may be received that indicates the plurality of variables to use in input dataset 124. For example, the second indicator may indicate one or more column numbers or one or more column names. As another option, all of the columns of input dataset 124 except a first or a last column may be assumed to be the plurality of variables. The plurality of variables are the variables that define each observation vector $x_i$. In an illustrative embodiment, each variable of the plurality of variables can be associated with an interval variable type. Any variable of the plurality of variables that has a standard deviation of zero indicates a constant variable in input dataset 124. Constant variables do not contribute to the clustering and are ignored. A number of the plurality of variables may be indicated by d.

In an operation 204, a third indicator of a mass parameter value $\alpha_0$ of the DP may be received. In an alternative embodiment, the third indicator may not be received. For example, a default value may be stored, for example, in computer-readable medium 108 and used automatically. In another alternative embodiment, the value of the mass parameter value $\alpha_0$ may not be selectable. Instead, a fixed, predefined value may be used. For illustration, a default value of the mass parameter value $\alpha_0$ may be 1.0 though other values may be used.

In an operation 206, a fourth indicator of a covariance option may be received that indicates whether the "linked model" mixture model using the common covariance for the clusters is used. In an alternative embodiment, the fourth indicator may not be received. For example, a default value may be stored, for example, in computer-readable medium 108 and used automatically. In another alternative embodiment, the value of the covariance option may not be selectable. Instead, a fixed, predefined value may be used. For illustration, a default value of the covariance option may be "true" though other values may be used. The covariance option indicating true may indicate that the "linked model" mixture model using the common covariance for the clusters is used.

In an operation 208, a fifth indicator of a maximum number of iterations $I_{max}$ may be received. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 210, a sixth indicator of a convergence threshold value Th may be received. In an alternative embodiment, the sixth indicator may not be received. For example, a default value may be stored, for example, in computer-readable medium 108 and used automatically. In another alternative embodiment, the value of the convergence threshold value Th may not be selectable. Instead, a fixed, predefined value may be used. For illustration, a default value of the convergence threshold value Th may be 0.01 though other values may be used.

In an operation 212, a seventh indicator of a maximum number of clusters to consider $K_{max}$ may be received. In an alternative embodiment, the seventh indicator may not be received. For example, a default value may be stored, for example, in computer-readable medium 108 and used automatically. In another alternative embodiment, the value of the maximum number of clusters to consider $K_{max}$ may not be selectable. Instead, a fixed, predefined value may be used. For illustration, a default value of the maximum number of clusters to consider $K_{max}$ may be 100 though other values may be used.

In an operation 214, an eighth indicator of a first normal-Wishart distribution parameter $\beta_0$ may be received. In an illustrative embodiment, the first normal-Wishart distribution parameter $\beta_0$ is a scalar value. The first normal-Wishart distribution parameter $\beta_0$ may be referred to as a concentration parameter of the normal-Wishart distribution. In an alternative embodiment, the eighth indicator may not be received. For example, a default value may be stored, for example, in computer-readable medium 108 and used automatically. In another alternative embodiment, the value for the first normal-Wishart distribution parameter $\beta_0$ may not be selectable. Instead, a fixed, predefined value may be used. For illustration, a default value for the first normal-Wishart distribution parameter value $\beta_0$ may be one though other values may be used.

In an operation 216, a ninth indicator of a second normal-Wishart distribution parameter vector $v_0$ may be received. In an illustrative embodiment, the second normal-Wishart distribution parameter $v_0$ is a scalar value. The second normal-Wishart distribution parameter v may be referred to as a degree of freedom parameter of the normal-Wishart distribution. In an alternative embodiment, the ninth indicator may not be received. For example, a default value may be stored, for example, in computer-readable medium 108 and used automatically. In another alternative embodiment, the value for the second normal-Wishart distribution parameter $v_0$ may not be selectable. Instead, a fixed, predefined value may be used. For illustration, a default value for the second normal-Wishart distribution parameter value $v_0$ may be one though other values may be used.

In an operation 218, a tenth indicator of a batch parameter(s) may be received. The tenth indicator may include a percentage value p and/or a number of observations value $N_b$ that are the batch parameters. The percentage value may be defined as a percentage or as a decimal value. The batch parameters define a batch size $N_b$ used each iteration. In an alternative embodiment, the tenth indicator may not be received. For example, default value(s) may be stored, for example, in computer-readable medium 108 and used automatically. In another alternative embodiment, the value(s) for the percentage value p and/or the number of observations value $N_b$ may not be selectable. Instead, fixed, predefined value(s) may be used. For illustration, a default value for the percentage value p may be 0.1 to indicate 10% of the observations included in input dataset 124 are used to define the batch size each iteration though other values may be used. When not defined using the tenth indicator, the percentage value p may be defined using $$\frac{N_b}{n} = p,$$

where n is the number of observation vectors included in input dataset 124. When not defined using the tenth indicator, the number of observations value may be defined using $N_b$=int(pn).

In an operation 220, an eleventh indicator of an initialization option may be received that indicates whether the batch size is used to initialize the mean and covariance parameters. In an alternative embodiment, the eleventh indicator may not be received. For example, a default value may be stored, for example, in computer-readable medium 108 and used automatically. In another alternative embodiment, the value of the initialization option may not be selectable. Instead, a fixed, predefined value may be used. For illustration, a default value of the initialization option may be "true" though other values may be used. The initialization option indicating true may indicate that the batch size is used to initialize the mean and covariance parameters.

In an operation 222, a determination is made concerning whether the initialization option indicates that the batch size is used to initialize the mean and covariance parameters. When the initialization option is true, processing continues in an operation 224. When the initialization option is false, processing continues in an operation 228.

In operation 224, a batch size number of observations is selected. For each selected observation vector, an index to its position in input dataset 124 may be stored in an index array or list l such as l=[$l_1, l_2, \ldots, l_{N_b}$] so that a mapping between observations selected in the batch is maintained to a respective observation in input dataset 124. For example, if a first observation vector selected from input dataset 124 is a 10th observation, $l_1$=10; if a second observation vector selected from input dataset 124 is a 14th observation, $l_2$=14. When p=1 or 100%, the batch of observation vectors includes all of the observation vectors included in input dataset 124.

In an operation 226, a mean vector m and a standard deviation vector σ may be computed using the selected observations, and processing continues in operation 230. The mean may first be computed using $$m_j = \frac{1}{N_b} \sum_{i=l_1}^{l_{N_b}} x_{i,j}, j = 1, 2, ..., d,$$

and the standard deviation vector σ may be computed using $$\sigma_j = \sqrt{\frac{1}{N_b - 1} \sum_{i=l_1}^{l_{N_b}} (x_{i,j} - m_j)^2}, j = 1, 2, ..., d$$

for each variable of the plurality of variables, where $x_{i,j}$ is a variable value for a $j^{th}$ variable of the $i^{th}$ observation vector read from input dataset 124, $m_j$ is the mean value of the $j^{th}$ variable, and $N_b$ is a number of the plurality of observation vectors selected from input dataset 124.

In an illustrative embodiment, the observations may be selected and the mean vector may be computed in a loop over the observations included in input dataset 124 in a manner similar to that shown in FIG. 9A. When an observation is processed, a random draw from a binary distribution with the percentage value p as an input parameter may be used to determine whether to include the observation in the batch. If included in the batch, $x_i$ is added to a mean sum vector $m_s = m_s + x_i$ initialized to a zero value vector, and an observation counter N, initialized to a zero value, N=N+1 is incremented so that processing is done when the counter indicates that N≥$N_b$ so that $N_b$ observations have been selected. If not included in the batch, $x_i$ is skipped. After computing the mean sum vector $m_s$, the mean vector m may be computed using $$m_j = \frac{m_s}{N_b},$$

where $m_s$ is the mean sum vector. The standard deviation vector σ may be computed in a manner similar to that shown in FIG. 9B using the same observations selected to compute the mean vector m.

In an operation 228, the mean vector m may be computed using $$m_j = \frac{1}{n} \sum_{i=1}^{n} x_{i,j}, j = 1, 2, ..., d,$$

and the standard deviation vector σ may be computed using $$\sigma_j = \sqrt{\frac{1}{n-1} \sum_{i=1}^{n} (x_{i,j} - m_j)^2}, j = 1, 2, ..., D$$

for each variable of the plurality of variables, where $x_{ij}$ is a variable value for a $j^{th}$ variable of the $i^{th}$ observation vector read from input dataset 124, $m_j$ is the mean value of the $j^{th}$ variable, and n is a number of the plurality of observation vectors read from input dataset 124.

In an operation 230, any variable of the plurality of variables that has a standard deviation value $\sigma_j$=0 is removed from the plurality of variables, and the number of variables d is reduced based on a number of variables removed. Processing continues in an operation 232 shown referring to FIG. 2B.

Referring to FIG. 2B, in operation 232, a third normal-Wishart distribution parameter vector $m_0$ is initialized using $m_0$=m.

In an operation 234, a fourth normal-Wishart distribution parameter matrix $\Psi_0^{-1}$ also referred to as an inverse precision matrix is initialized using $$\Psi_0^{-1} = \frac{1}{n-1} \sum_{i=1}^{n} (x_i - m_0)(x_i - m_0)^\top,$$

where τ indicates a transpose of the vector, and $x_i$ is the $i^{th}$ observation vector read from input dataset 124 when the initialization option is false. When the initialization option is true, fourth normal-Wishart distribution parameter matrix $\Psi_0^{-1}$ is initialized using $$\Psi_0^{-1} = \frac{1}{N_b - 1} \sum_{i=l_1}^{l_{N_b}} (x_i - m_0)(x_i - m_0)^\top$$

using the same observations selected to compute the mean vector m in operation 226.

In an operation 236, a responsibility parameter value $r_{i,k}$ is initialized for each observation vector and for each cluster to define a responsibility vector $r_i$ for each observation vector with dimension $K_{max}$. For illustration, the responsibility parameter value $r_{i,k}$ may be initialized using draws from a multinomial distribution such that a probability that an $i^{th}$ observation vector read from input dataset 124 is assigned to each cluster k=1, 2, ..., $K_{max}$ sums to one or $\sum_{k=1}^{K_{max}} r_{i,k}$=1 for i=1, 2, ..., n. As another illustration, the responsibility parameter value $r_{i,k}$ may be initialized using $r_{i,k}$=1/$K_{max}$, i=1, 2, ..., n, and k=1, 2, ..., $K_{max}$.

In an operation 238, an iteration counter I is initialized, for example, as I=0.

In an operation 240, the iteration counter I is incremented, for example, as I=I+1.

In an operation 242, parameters $\gamma_{k,1}$ and $\gamma_{k,2}$ of the beta distribution are updated for each cluster k=1, ..., $K_{max}$. For example, $\gamma_{k,1}=1+\sum_{i=1}^{n} r_{1,k}$, k=1, 2, ..., $K_{max}$ and $\gamma_{k,2}=\alpha_0+\sum_{l=k+1}^{K_{max}} \sum_{i=1}^{n} r_{i,l}$, k=1, 2, ..., $K_{max}$.

Similar to operation 224, in an operation 244, a batch of observation vectors is randomly selected from input dataset 124 using the percentage value p and the number of observations value $N_b$. Again, when p=1 or 100%, the batch of observation vectors includes all of the observation vectors included in input dataset 124 making the index array l=[$l_1$=1, $l_2$=2, ..., $l_{N_b}$=n].

In an operation 246, parameters $m_k$, $\beta_k$, $\Psi_k$, $\nu_k$ or $m_k$, $\beta_k$, $\Psi$, $\nu$ of the normal-Wishart distribution are updated based on the covariance option. For example, the parameters $m_k$, $\beta_k$, $\Psi$, $\nu$ of the normal-Wishart distribution are updated for each cluster k=1, 2, ..., $K_{max}$ using $$m_k = \frac{\beta_0 m_0 + \sum_{i=l_1}^{l_{N_b}} r_{i,k} x_i}{\beta_0 + \sum_{i=l_1}^{l_{N_b}} r_{i,k}},$$

$$\beta_k = \beta_0 + \sum_{i=l_1}^{l_{N_b}} r_{i,k},$$

$$v = v_0 + \sum_{k=1}^{K_{max}} \sum_{i=l_1}^{l_{N_b}} r_{i,k}, \text{ and}$$

$$\Psi = \left(\Psi_0^{-1} + \sum_{k=1}^{K_{max}} \beta_0(m_k - m_0)(m_k - m_0)^\top + \sum_{k=1}^{K_{max}} \sum_{i=l_1}^{l_{N_b}} r_{i,k}(x_i - m_k)(x_i - m_k)^\top\right)^{-1}$$

when the covariance option indicates the "linked model" mixture model is used (a common v value and $\Psi$ matrix is used for each cluster), and using $$m_k = \frac{\beta_0 m_0 + \sum_{i=l_1}^{l_{N_b}} r_{i,k} x_i}{\beta_0 + \sum_{i=l_1}^{l_{N_b}} r_{i,k}},$$

$$\beta_k = \beta_0 + \sum_{i=l_1}^{l_{N_b}} r_{i,k},$$

$$v = v_0 + \sum_{i=l_1}^{l_{N_b}} r_{i,k}, \text{ and}$$

$$\Psi = \left(\Psi_0^{-1} + \beta_0(m_k - m_0)(m_k - m_0)^\top + \sum_{i=l_1}^{l_{N_b}} r_{i,k}(x_i - m_k)(x_i - m_k)^\top\right)^{-1}$$

otherwise, where $m_k$, $\beta_k$, $\Psi_k$, $v_k$ are the parameters of the normal-Wishart distribution of the $k^{th}$ cluster, and $x_i$ is an $i^{th}$ observation vector selected in operation 244, $i=l_1, l_2, \ldots, l_{N_b}$, $m_k$ is a d-dimensional vector, $\beta_k$, $v_k$, and $v$ are scalar values, $\Psi_k$ is a d by d-dimensional matrix, and $\Psi$ is a d by d-dimensional matrix.

In an operation 248, the responsibility parameter value $r_{i,k}$ is updated for each observation vector $x_i$, $i=l_1, l_2, \ldots, l_{N_b}$ selected in operation 244, and for each cluster $k=1, 2, \ldots, K_{max}$. For example, $$r_{i,k} \propto \exp(\Gamma^{(1)}(\gamma_{k,1}) - \Gamma^{(1)}(\gamma_{k,1} + \gamma_{k,2}) + \sum_{l=1}^{k-1} (\Gamma^{(1)}(\gamma_{l,2}) - \Gamma^{(1)}(\gamma_{l,1} + \gamma_{l,2})) + \frac{1}{2}\Gamma_d^{(1)}\left(\frac{v}{2}\right) + \frac{1}{2}\log|\Psi| - \frac{1}{2}(x_i - m_k)^T v \Psi(x_i - m_k) - \frac{d}{2}\beta_k^{-1})$$

when the covariance option indicates the "linked model" mixture model is used, and using $$r_{i,k} \propto \exp\left(\Gamma^{(1)}(\gamma_{k,1}) - \Gamma^{(1)}(\gamma_{k,1} + \gamma_{k,2}) + \sum_{l=1}^{k-1} (\Gamma^{(1)}(\gamma_{l,2}) - \Gamma^{(1)}(\gamma_{l,1} + \gamma_{l,2})) + \frac{1}{2}\Gamma_d^{(1)}\left(\frac{v_k}{2}\right) + \frac{1}{2}\log|\Psi_k| - \frac{1}{2}(x_i - m_k)^\top v\Psi_k(x_i - m_k) - \frac{d}{2}\beta_k^{-1}\right)$$

otherwise, where $\Gamma^{(1)}$ indicates a digamma function that is a derivative function of a logarithm of a gamma function, and $\Gamma_d^{(1)}$ indicates a d dimensional digamma function.

In an operation 250, ELBO is computed that is a sum of bounds for each variable of the plurality of variables. For example, ELBO is computed using $$ELBO = \sum_{k=1}^{K_{max}} (B_{\phi_k} + B_{\mu_k} + B_{\Lambda_k}) + \sum_{i=l_1}^{l_{N_b}} (B_{z_i} + B_{x_i})$$

where $$B_{\phi_k} = \log\Gamma(1 + \alpha_0) - \log\Gamma(\alpha_0) + (\alpha_0 - 1)(\Gamma^{(1)}(\gamma_{k,2}) - \Gamma^{(1)}(\gamma_{k,1} + \gamma_{y,2})) - \log\Gamma(\gamma_{k,1} + \gamma_{k,2}) + \log\Gamma(\gamma_{k,1}) + \log\Gamma(\gamma_{k,2}) - (\gamma_{k,1} - 1)(\Gamma^{(1)}(\gamma_{k,1}) - \Gamma^{(1)}(\gamma_{k,1} + \gamma_{k,1})) - (\gamma_{k,2} - 1)(\Gamma^{(1)}(\gamma_{k,2}) - \Gamma^{(1)}(\gamma_{k,1} + \gamma_{k,1})),$$

$$B_{\mu_k} = \frac{d}{2}\log\left(\frac{\beta_0}{\beta_k}\right) - \frac{d}{2}\frac{\beta_0}{\beta_k} + \frac{d}{2} - \frac{1}{2}(m_k - m_0)^\top \beta_0 v \Psi(m_k - m_0),$$

$$B_{\Lambda_k} = -\frac{1}{2}(v - v_0)\Gamma_d^{(1)}\left(\frac{v}{2}\right) - \left(\frac{v}{2}\right)tr(\Psi_0^{-1}\Psi) + \frac{dv}{2} - \frac{v_0}{2}\log\frac{|\Psi_0|}{|\Psi|} - \log\frac{r_d\left(\frac{v_0}{2}\right)}{r_d\left(\frac{v}{2}\right)},$$

$$B_{z_i} = \sum_{k=1}^{K_{max}} r_{i,k}(\Gamma^{(1)}(\gamma_{k,1}) - \Gamma^{(1)}(\gamma_{k,1} + \gamma_{k,1})) + \sum_{k=1}^{K_{max}} \left(\sum_{i=k+1}^{K_{max}} r_{i,l}\right)(\Gamma^{(1)}(\gamma_{k,2}) - \Gamma^{(1)}(\gamma_{k,1} + \gamma_{k,1})) - \sum_{k=1}^{K_{max}} r_{i,k} \log r_{i,k},$$

and $B_{x_i} = \sum_{k=1}^{K_{max}} r_{i,k}\left(-\frac{d}{2}\log\pi + \frac{1}{2}\Gamma_d^{(1)}\left(\frac{v}{2}\right) + \frac{1}{2}\log|\Psi| - \frac{1}{2}(x_i - m_k)^\top v\Psi(x_i - m_k) - \frac{d}{2}\beta_k^{-1}\right)$ when the covariance option indicates the "linked model" mixture model is used, and $$B_{\phi_k} = \log\Gamma(1 + \alpha_0) - \log\Gamma(\alpha_0) + (\alpha_0 - 1)(\Gamma^{(1)}(\gamma_{k,2}) - \Gamma^{(1)}(\gamma_{k,1} + \gamma_{y,2})) - \log\Gamma(\gamma_{k,1} + \gamma_{k,2}) + \log\Gamma(\gamma_{k,1}) + \log\Gamma(\gamma_{k,2}) - (\gamma_{k,1} - 1)(\Gamma^{(1)}(\gamma_{k,1}) - \Gamma^{(1)}(\gamma_{k,1} + \gamma_{k,1})) - (\gamma_{k,2} - 1)(\Gamma^{(1)}(\gamma_{k,2}) - \Gamma^{(1)}(\gamma_{k,1} + \gamma_{k,1})),$$

$$B_{\mu_k} = \frac{d}{2}\log\left(\frac{\beta_0}{\beta_k}\right) - \frac{d}{2}\frac{\beta_0}{\beta_k} + \frac{d}{2} - \frac{1}{2}(m_k - m_0)^\top \beta_0 v \Psi(m_k - m_0), B_{\Lambda_k} = -\frac{1}{2}(v_k - v_0)\Gamma_d^{(1)}\left(\frac{v_k}{2}\right) - \left(\frac{v_k}{2}\right)tr(\Psi_0^{-1}\Psi) + \frac{dv_k}{2} - \frac{v_0}{2}\log\frac{|\Psi_0|}{|\Psi_k|} - \log\frac{r_d\left(\frac{v_0}{2}\right)}{r_d\left(\frac{v_k}{2}\right)},$$

$$B_{z_i} = \sum_{k=1}^{K_{max}} r_{i,k}(\Gamma^{(1)}(\gamma_{k,1}) - \Gamma^{(1)}(\gamma_{k,1} + \gamma_{k,1})) +$$

$$\sum_{k=1}^{K_{max}} \left( \sum_{i=k+1}^{K_{max}} r_{i,l} \right) (\Gamma^{(1)}(\gamma_{k,2}) - \Gamma^{(1)}(\gamma_{k,1} + \gamma_{k,1})) - \sum_{k=1}^{K_{max}} r_{i,k} \log r_{i,k},$$

$$\text{and } B_{x_i} = \sum_{k=1}^{K_{max}} r_{i,k} \left( -\frac{d}{2} \log \pi + \frac{1}{2} \Gamma_d^{(1)} \left( \frac{v}{2} \right) + \frac{1}{2} \log |\Psi_k| - \frac{1}{2} (x_i - m_k)^\top v_k \Psi_k (x_i - m_k) - \frac{d}{2} \beta_k^{-1} \right)$$

is used otherwise, where $x_i$ is an $i^{th}$ observation vector selected in operation 244, $i=1_1, 1_2, \ldots, 1_{N_b}$.

In an operation 252, $\Delta$ELBO is computed using $\Delta$ELBO=|ELBO−ELBO$_p$| unless the iteration counter I=1. When the iteration counter I=1, a value for ELBO$_p$ has not been determined.

In an operation 254, a determination is made concerning whether $\Delta$ELBO<Th. If $\Delta$ELBO<Th and I≠1, processing continues in an operation 260 to indicate convergence has been achieved. If $\Delta$ELBO≥Th or I=1, processing continues in an operation 256.

In operation 256, a determination is made concerning whether I≤I$_{max}$. If I>I$_{max}$, processing continues in operation 260 to indicate convergence has been stopped. If I≤I$_{max}$, processing continues in an operation 258.

In operation 258, ELBO$_p$ is updated for a next iteration using ELBO$_p$=ELBO, and processing continues in operation 240 to update the SVB gradient ascent step parameters.

In operation 260, the responsibility parameter value $r_{i,k}$ is updated for each observation vector $x_i$, i=1, 2, . . . , n included in input dataset 124, and for each cluster k=1, 2, . . . , K$_{max}$. For example, $$r_{i,k} \propto \exp(\Gamma^{(1)}(\gamma_{k,1}) - \Gamma^{(1)}(\gamma_{k,1} + \gamma_{k,2}) + \sum_{l=1}^{k-1} (\Gamma^{(1)}(\gamma_{l,2}) - \Gamma^{(1)}(\gamma_{l,1} + \gamma_{l,2})) + \frac{1}{2} \Gamma_d^{(1)} \left( \frac{v}{2} \right) + \frac{1}{2} \log |\Psi| - \frac{1}{2} (x_i - m_k)^\top v \Psi (x_i - m_k) - \frac{d}{2} \beta_k^{-1}$$

when the covariance option indicates the "linked model" mixture model is used, and using $$r_{i,k} \propto \exp\left( \Gamma^{(1)}(\gamma_{k,1}) - \Gamma^{(1)}(\gamma_{k,1} + \gamma_{k,2}) + \sum_{l=1}^{k-1} (\Gamma^{(1)}(\gamma_{l,2}) - \Gamma^{(1)}(\gamma_{l,1} + \gamma_{l,2})) + \frac{1}{2} \Gamma_d^{(1)} \left( \frac{v_k}{2} \right) + \frac{1}{2} \log |\Psi_k| - \frac{1}{2} (x_i - m_k)^\top v_k \Psi_k (x_i - m_k) - \frac{d}{2} \beta_k^{-1} \right)$$

otherwise, where $\Gamma^{(1)}$ indicates a digamma function that is a derivative function of a logarithm of a gamma function, and $\Gamma_d^{(1)}$ indicates a d dimensional digamma function. When p=1 or 100%, the responsibility parameter value $r_{i,k}$ need not be updated because the responsibility parameter value $r_{i,k}$ has already been updated for each observation vector included in input dataset 124 in operation 248.

In an operation 262, a cluster membership index $z_i$ is determined using a multinomial distribution with the updated responsibility parameter value $r_{i,k}$ as the parameter value for each observation vector $x_i$, i=1, 2, . . . , n. The cluster membership index $z_i$ indicates a cluster to which each observation vector $x_i$ is assigned. For example, a random draw is made and compared to each probability value defined for each cluster k=1, 2, . . . , K$_{max}$ by $r_{i,k}$ to determine the cluster membership index $z_i$ that is one of k=1, 2, . . . , K$_{max}$.

In an operation 264, a number of clusters K$_n$ that include at least one observation is determined from K$_{max}$ based on the cluster membership index $z_i$ for each observation vector $x_i$, i=1, 2, . . . , n. For example, K$_n$ is a number of unique cluster membership indices to which any observation vector is assigned.

In operation 266, the ELBO, $m_k$, and $\Psi_k$ computed for each cluster k=1, 2, . . . , K$_n$ of the number of clusters K$_n$ are output. Additional information that may be output are a number of observations in each cluster, a neighbor cluster of each cluster whose Gaussian mean is closest to the Gaussian mean of the cluster, the cluster membership index $z_i$ for each observation, the responsibility parameter value $r_{i,k}$ for each observation and each cluster, a clustering model description so that the model can be used for data clustering, etc. For example, the clustering model description may be output to clustering model description 126, and the cluster membership index $z_i$ for each observation and the responsibility parameter value $r_{i,k}$ for each observation and each cluster may be output to clustering model output data 128. The clustering model description may include the clustering algorithm indicating the Gaussian mixture model, the inference method indicating SVB, the number of clusters K$_n$, the mass parameter value $\alpha_0$, the covariance option, the maximum number of iterations I$_m$, the convergence threshold value Th, ELBO, $m_k$, and $\Psi_k$ computed for each cluster k=1, 2, of the number of clusters K$_n$, etc.

Figure 3:
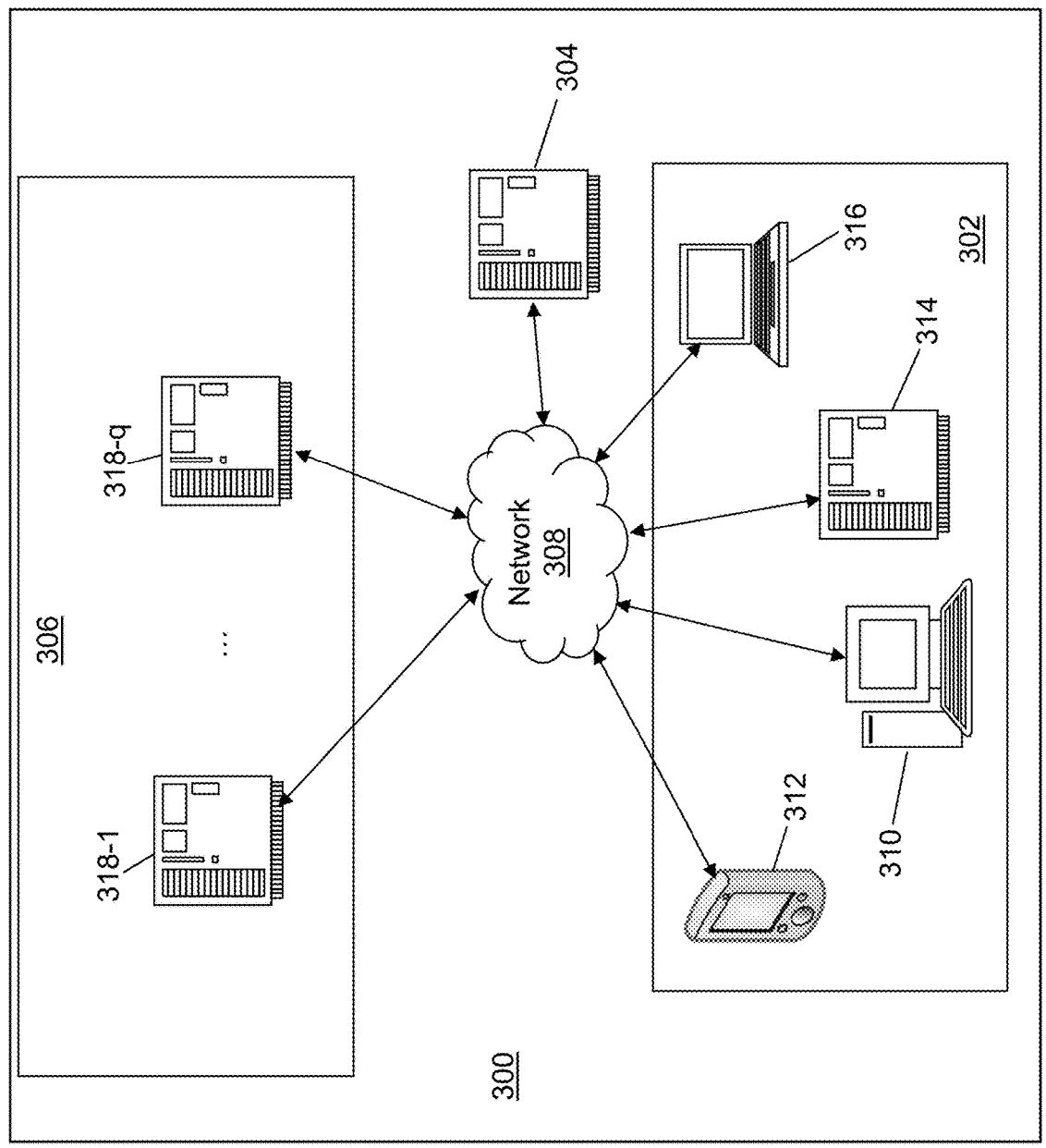
FIG. 3 depicts a block diagram of a clustering model training system in accordance with an illustrative embodiment.

Referring to FIG. 3, a block diagram of a clustering model training system 300 is shown in accordance with an illustrative embodiment. In an illustrative embodiment, clustering model training system 300 may include a user system 302, a controller device 304, a worker system 306, and a network 308. Each of user system 302, controller device 304, and worker system 306 may be composed of zero or more discrete computing devices in communication through network 308. User system 302 and controller device 304 may be integrated into a single computing device capable of executing multiple threads with no worker devices of worker system 306.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 302 may send and receive signals through network 308 to/from another of the one or more computing devices of user system 302 and/or to/from controller device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
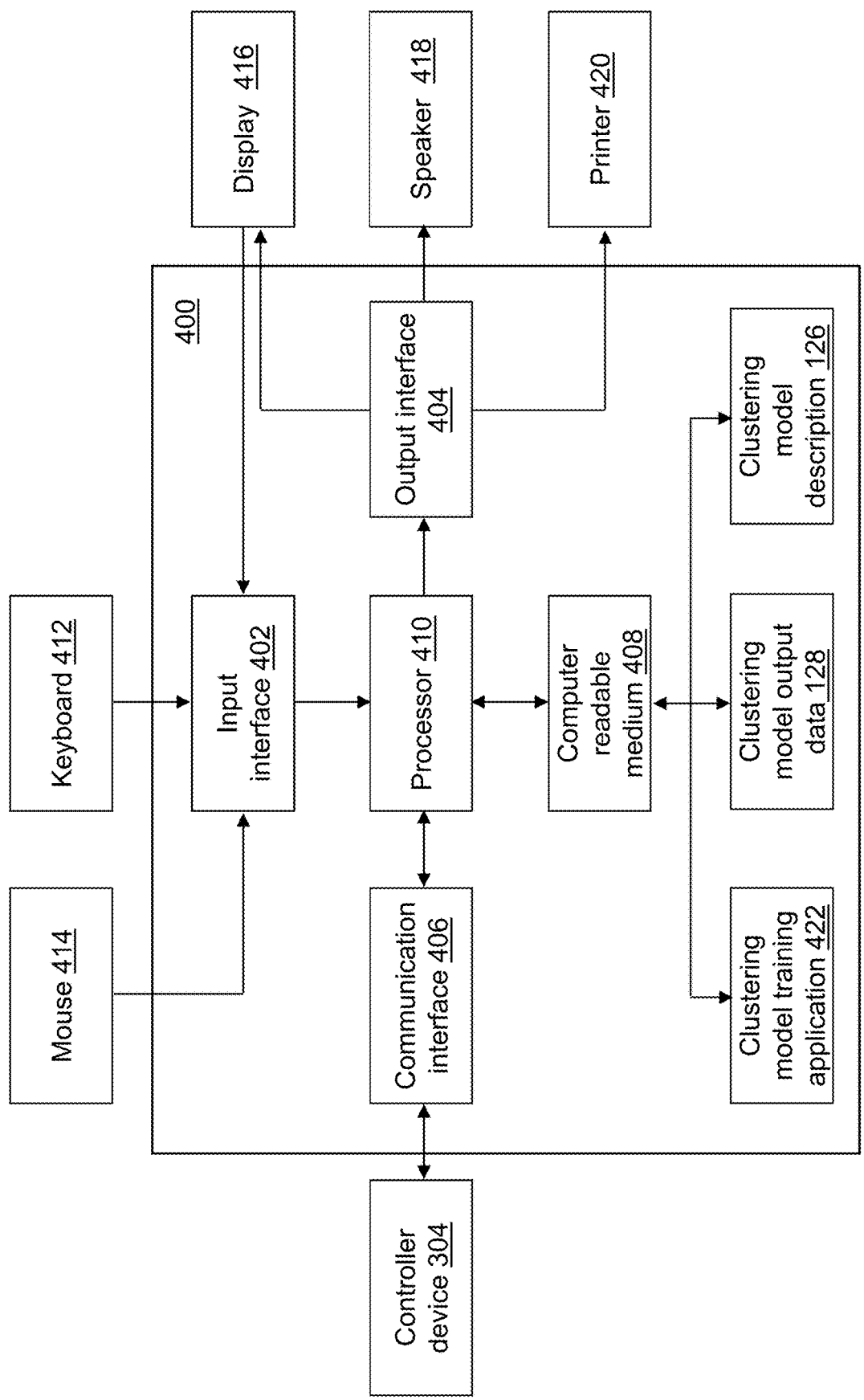
FIG. 4 depicts a block diagram of a user device of the clustering model training system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, a clustering model training application 422, clustering model description 126, and clustering model output data 128. Each computing device of user system 302 may be executing clustering model training application 422 of the same or different type.

Referring again to FIG. 3, controller device 304 can include any form factor of computing device. For illustration, FIG. 3 represents controller device 304 as a server computer. Controller device 304 may send and receive signals through network 308 to/from user system 302 and/or to/from worker system 306. Controller device 304 may communicate using various transmission media that may be wired and/or wireless as understood by those skilled in the art. Controller device 304 may be implemented on a plurality of computing devices of the same or different type. Clustering model training system 300 further may include a plurality of controller devices.

Figure 5:
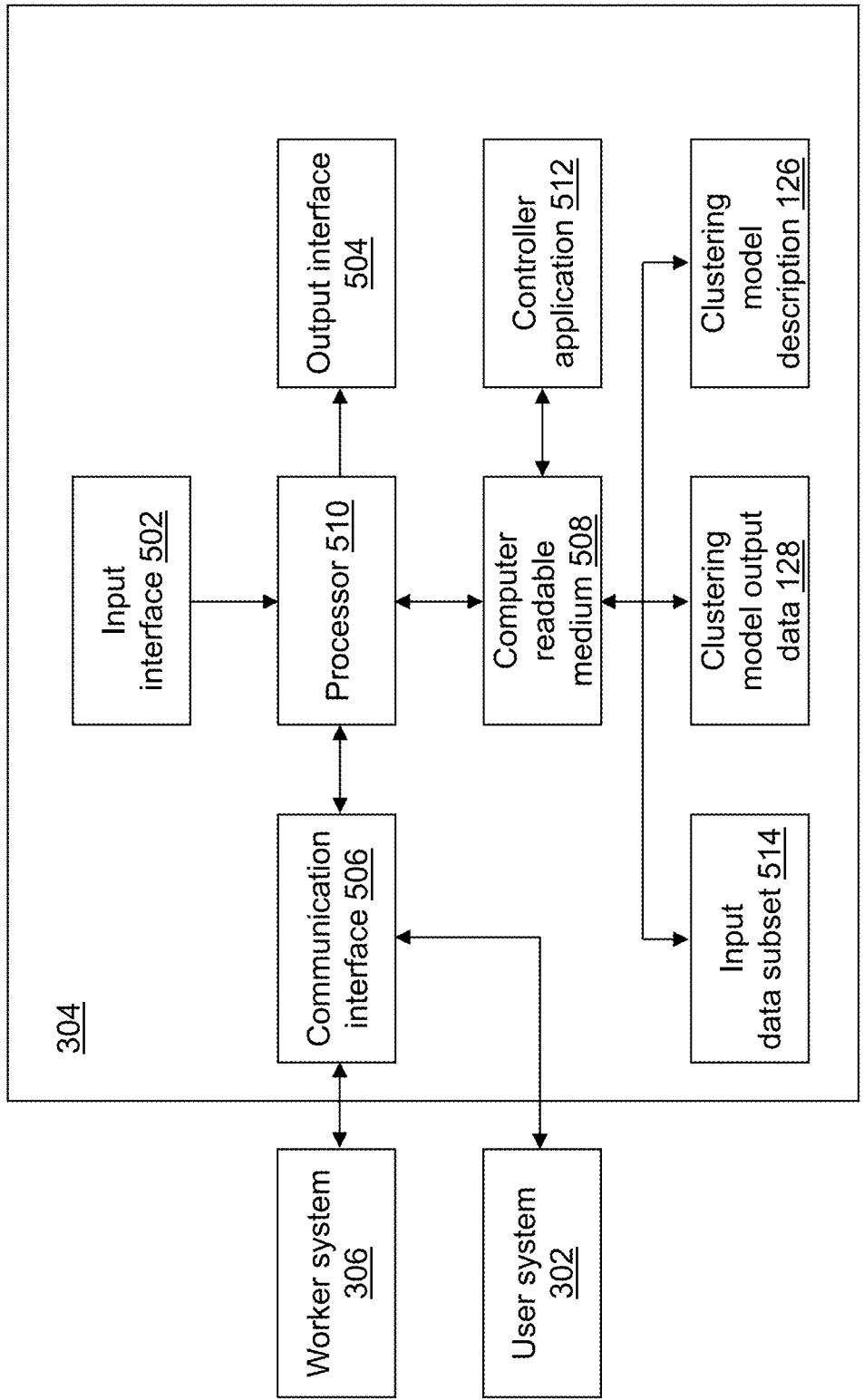
FIG. 5 depicts a block diagram of a controller device of the clustering model training system of FIG. 3 in accordance with an illustrative embodiment.

For illustration, referring to FIG. 5, a block diagram of controller device 304 is shown in accordance with an illustrative embodiment. Controller device 304 may include a third input interface 502, a third output interface 504, a third communication interface 506, a third computer-readable medium 508, a third processor 510, a controller application 512, an input data subset 514, clustering model output data 128, and clustering model description 126. Controller device 304 may execute controller application 512 that creates clustering model description 126.

Referring again to FIG. 3, the one or more computing devices of worker system 306 may include computers of any form factor such as a desktop, a server, a laptop, etc. For example, in the illustrative embodiment, worker system 306 includes a first server computer 318-1, . . . , and a qth server computer 318-q. Each server computer may support use of a plurality of threads. The computing devices of worker system 306 may send and receive signals through network 308 to/from controller device 304 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6:
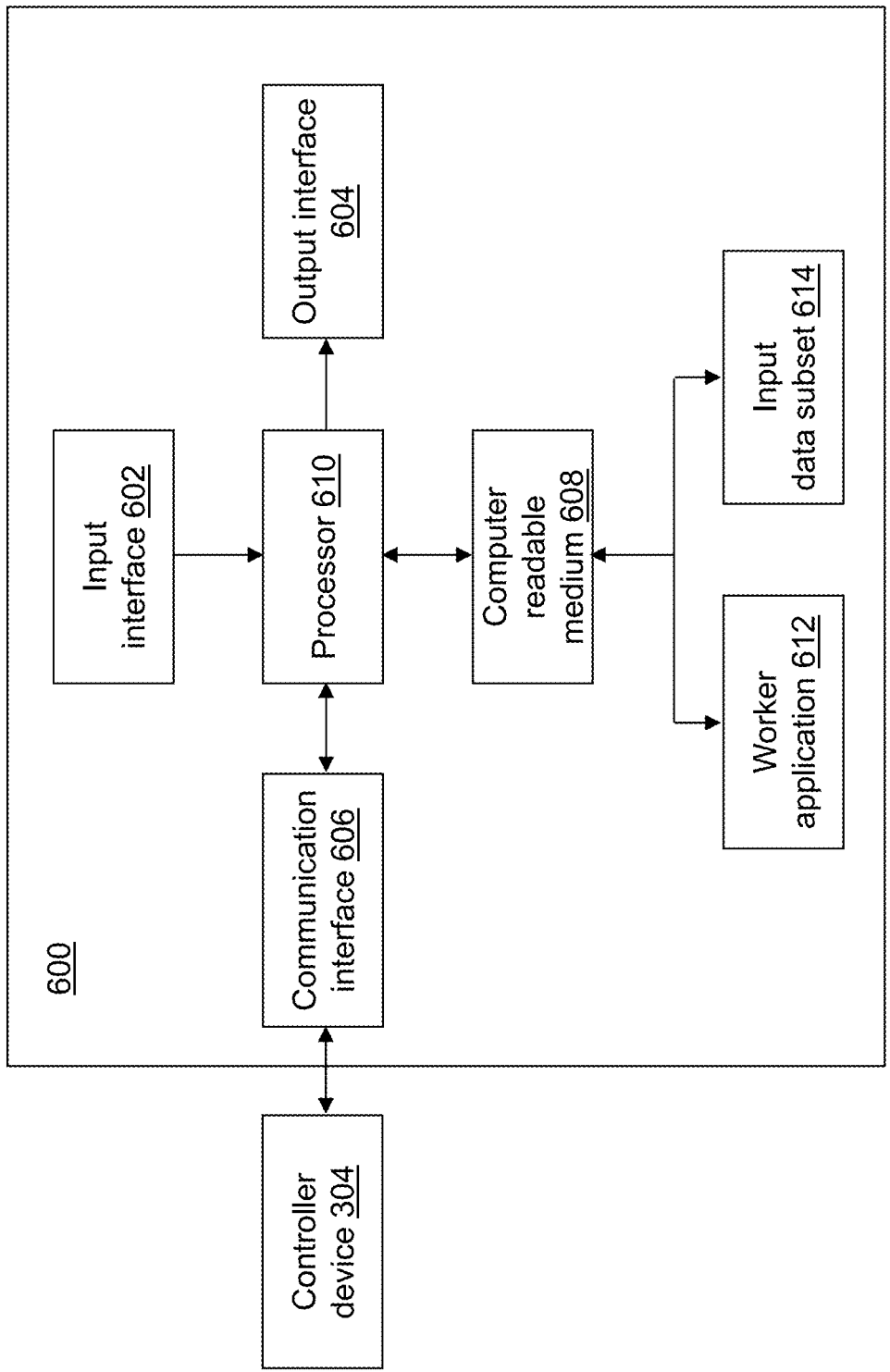
FIG. 6 depicts a block diagram of a worker-thread device of the clustering model training system of FIG. 3 in accordance with an illustrative embodiment.

For illustration, referring to FIG. 6, a block diagram of a worker device 600 is shown in accordance with an example embodiment. Worker device 600 is an example computing device of worker system 306. For example, each of first server computer 318-1, . . . , and qth server computer 318-q may be an instance of worker device 600. Worker device 600 may include a fourth input interface 602, a fourth output interface 604, a fourth communication interface 606, a fourth computer-readable medium 608, a fourth processor 610, a worker application 612, and an input data subset 614. Input dataset 124 may be stored in input data subset 614 distributed across each worker device 600 of worker system 306. A portion of input dataset 124 may also be stored in input data subset 514 stored on controller device 304.

Referring again to FIG. 4, each user device 400 of user system 302 may include the same or different components and combinations of components. Fewer, different, and additional components may be incorporated into user device 400. Second input interface 402 provides the same or similar functionality as that described with reference to input interface 102 of clustering model training device 100 though referring to user device 400. Second output interface 404 provides the same or similar functionality as that described with reference to output interface 104 of clustering model training device 100 though referring to user device 400. Second communication interface 406 provides the same or similar functionality as that described with reference to communication interface 106 of clustering model training device 100 though referring to user device 400. Data and messages may be transferred between controller device 304 and user device 400 using second communication interface 406. Second computer-readable medium 408 provides the same or similar functionality as that described with reference to computer-readable medium 108 of clustering model training device 100 though referring to user device 400. Second processor 410 provides the same or similar functionality as that described with reference to processor 110 of clustering model training device 100 though referring to user device 400.

Clustering model training application 422 performs operations associated with training a clustering model. The operations may be implemented using hardware, firmware, software, or any combination of these methods. Referring to the example embodiment of FIG. 4, clustering model training application 422 is implemented in software (comprised of computer-readable and/or computer-executable instructions) stored in second computer-readable medium 408 and accessible by second processor 410 for execution of the instructions that embody the operations of clustering model training application 422. Clustering model training application 422 may be written using one or more programming languages, assembly languages, scripting languages, etc.

Clustering model training application 422 may be implemented as a Web application. Clustering model training application 422 may be integrated with other analytic tools. As an example, clustering model training application 422 may be part of an integrated data analytics software application and/or software architecture such as that offered by SAS Institute Inc. of Cary, N.C., USA. For example, clustering model training application 422 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, clustering model training application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS@ Viya™, SAS In-Memory Statistics for Hadoop®, all of which are developed and provided by SAS Institute Inc. of Cary, N.C., USA. Data mining is applicable in a wide variety of industries.

Referring to FIG. 5, fewer, different, or additional components may be incorporated into controller device 304. Third input interface 502 provides the same or similar functionality as that described with reference to input interface 102 of clustering model training device 100 though referring to controller device 304. Third output interface 504 provides the same or similar functionality as that described with reference to output interface 104 of clustering model training device 100 though referring to controller device 304. Third communication interface 506 provides the same or similar functionality as that described with reference to communication interface 106 of clustering model training device 100 though referring to controller device 304. Data and messages may be transferred between controller device 304 and user device 400 and/or worker device 600 using third communication interface 506. Third computer-readable medium 508 provides the same or similar functionality as that described with reference to computer-readable medium 108 of clustering model training device 100 though referring to controller device 304. Third processor 510 provides the same or similar functionality as that described with reference to processor 110 of clustering model training device 100 though referring to controller device 304.

Controller application 512 performs operations associated with training a clustering model based on inputs provided from user device 400 optionally using the computing devices of worker system 306. The operations may be implemented using hardware, firmware, software, or any combination of these methods. Referring to the example embodiment of FIG. 5, controller application 512 is implemented in software (comprised of computer-readable and/or computer-executable instructions) stored in third computer-readable medium 508 and accessible by third processor 510 for execution of the instructions that embody the operations of controller application 512. Controller application 512 may be written using one or more programming languages, assembly languages, scripting languages, etc. Controller application 512 may be implemented as a Web application.

Controller application 512 may be integrated with other analytic tools. As an example, controller application 512 may be part of an integrated data analytics software application and/or software architecture such as that offered by SAS Institute Inc. of Cary, N.C., USA. For example, controller application 512 may be part of SAS® Enterprise Miner™ developed and provided by SAS Institute Inc. of Cary, N.C., USA. Merely for further illustration, controller application 512 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Referring to FIG. 6, fewer, different, and additional components may be incorporated into worker device 600. Each worker device 600 of worker system 306 may include the same or different components or combination of components. Fourth input interface 602 provides the same or similar functionality as that described with reference to input interface 102 of clustering model training device 100 though referring to worker device 600. Fourth output interface 604 provides the same or similar functionality as that described with reference to output interface 104 of clustering model training device 100 though referring to worker device 600. Fourth communication interface 606 provides the same or similar functionality as that described with reference to communication interface 106 of clustering model training device 100 though referring to worker device 600. Data and messages may be transferred between controller device 304 and worker device 600 using fourth communication interface 606. Fourth computer-readable medium 608 provides the same or similar functionality as that described with reference to computer-readable medium 108 of clustering model training device 100 though referring to worker device 600. Fourth processor 610 provides the same or similar functionality as that described with reference to processor 110 of clustering model training device 100 though referring to worker device 600.

Worker application 612 may be integrated with other analytic tools. As an example, worker application 612 may be part of an integrated data analytics software application and/or software architecture such as that offered by SAS Institute Inc. of Cary, N.C., USA. For example, worker application 612 may be part of SAS® Enterprise Miner™ developed and provided by SAS Institute Inc. of Cary, N.C., USA. Merely for further illustration, worker application 612 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Clustering model training application 422, controller application 512, and worker application 612 may be the same or different applications that are integrated in various manners to train a clustering model using input dataset 124 distributed across controller device 304 and/or worker system 306 into input data subset 514 and/or input data subset 614, respectively.

Figure 7:
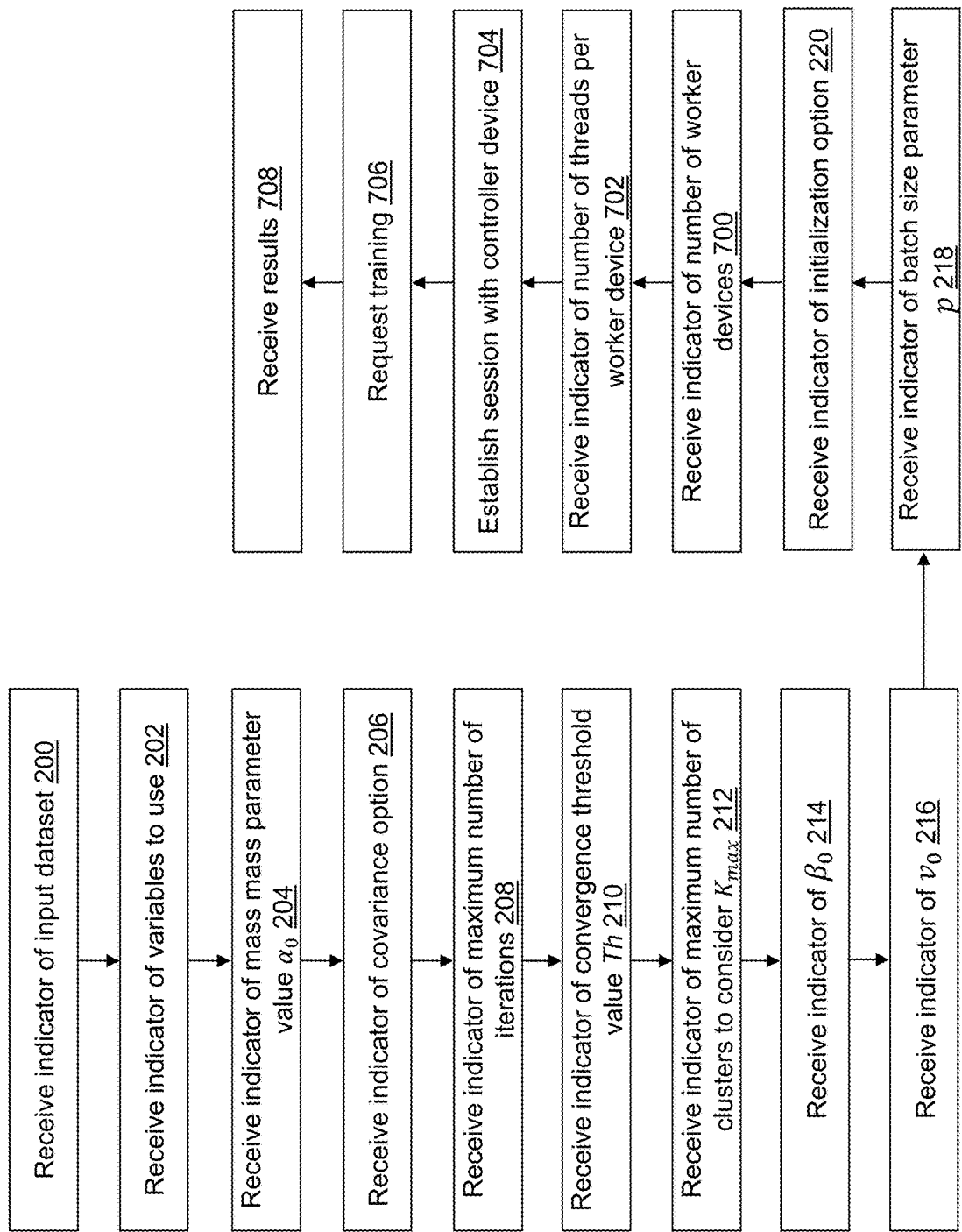
FIG. 7 depicts a flow diagram illustrating examples of operations performed by the user device of FIG. 4 in accordance with an illustrative embodiment.

Referring to FIG. 7, example operations associated with clustering model training application 422 are described. Additional, fewer, or different operations may be performed depending on the embodiment. The order of presentation of the operations of FIG. 7 is not intended to be limiting. A user can interact with one or more user interface windows presented to the user in a display under control of clustering model training application 422 independently or through a browser application in an order selectable by the user. Although some of the operational flows are presented in sequence, the various operations may be performed in various repetitions, concurrently, and/or in other orders than those that are illustrated. For example, a user may execute clustering model training application 422, which causes presentation of a first user interface window, which may include a plurality of menus and selectors such as drop down menus, buttons, text boxes, hyperlinks, etc. associated with clustering model training application 422 as understood by a person of skill in the art. As further understood by a person of skill in the art, various operations may be performed in parallel, for example, using a plurality of threads or a plurality of computing devices such as a grid or a cloud of computing devices.

Similar to clustering model training application 122, clustering model training application 422 may perform one or more of operations 200 to 220 to define parameters for execution of clustering model training application 422. In operation 200 performed by user device 400, the indicator of input dataset 124 may indicate input data subset 514 and/or input data subset 614.

In an operation 700, a twelfth indicator may be received that indicates the number of computing devices W of worker system 306. In an alternative embodiment, the twelfth indicator may not be received. For example, a default value may be stored, for example, in computer-readable medium 408 and used automatically. In another alternative embodiment, W may not be selectable. Instead, a fixed, predefined value may be used. The value further may be automatically determined based on a number of computing devices connected to controller device 304.

In an operation 702, a thirteenth indicator may be received that indicates a number of threads T of each computing device of worker system 306 and/or of controller device 304. In an alternative embodiment, the thirteenth indicator may not be received. For example, a default value may be stored, for example, in computer-readable medium 408 and used automatically. In another alternative embodiment, T may not be selectable. Instead, a fixed, predefined value may be used. The value further may be automatically determined based on a number of CPUs available in each computing device of worker system 306 and/or of controller device 304.

When W=0 and T=1, controller device 304 is performing the operations of FIGS. 2A and 2B. When W=0, controller device 304 may operate in single-machine mode meaning multithreaded operation using the number of threads T concurrently to take advantage of parallel execution on multiple processing units. When W=0, input dataset 124 is distributed into a plurality of input data subsets with each thread of the plurality of threads allocated a single input data subset 514. When W>0, controller device 304 may be a grid host.

In an operation 704, a session is established with controller device 304 when user device 400 and controller device 304 are not integrated. The session may further be established with controller device 304 and each worker deice 600 when W>0. User device 400 accepts commands from a user and relays instructions to controller device 304 when user device 400 and controller device 304 are not integrated. When W>0, controller device 304 establishes a communication network with the worker devices of worker system 306, sending instructions to the worker devices of worker system 306, collecting and aggregating the results of computations from the worker devices of worker system 306, and communicating final results to user device 400.

In an operation 706, training of the clustering model is requested. When controller device 304 and user device 400 are integrated in the same computing device, training is initiated as described further referring to FIGS. 8A and 8B. The request may include zero or more of the values defined for the parameters indicated in operations 200 to 220 or zero or more of the values may be stored in a memory location known to controller device 304 when controller device 304 and user device 400 are not integrated in the same computing device.

In an operation 708, some or all of the selected information output in operation 266 may be received from controller device 304 when controller device 304 and user device 400 are not integrated in the same computing device. As another example, an indicator may be received that indicates that the training process is complete. For example, one or more output tables may be presented on second display 416 when the training process is complete. As another option, second display 416 may present a statement indicating that the training process is complete. The user can access the output tables in a predefined location.

Figure 8A:
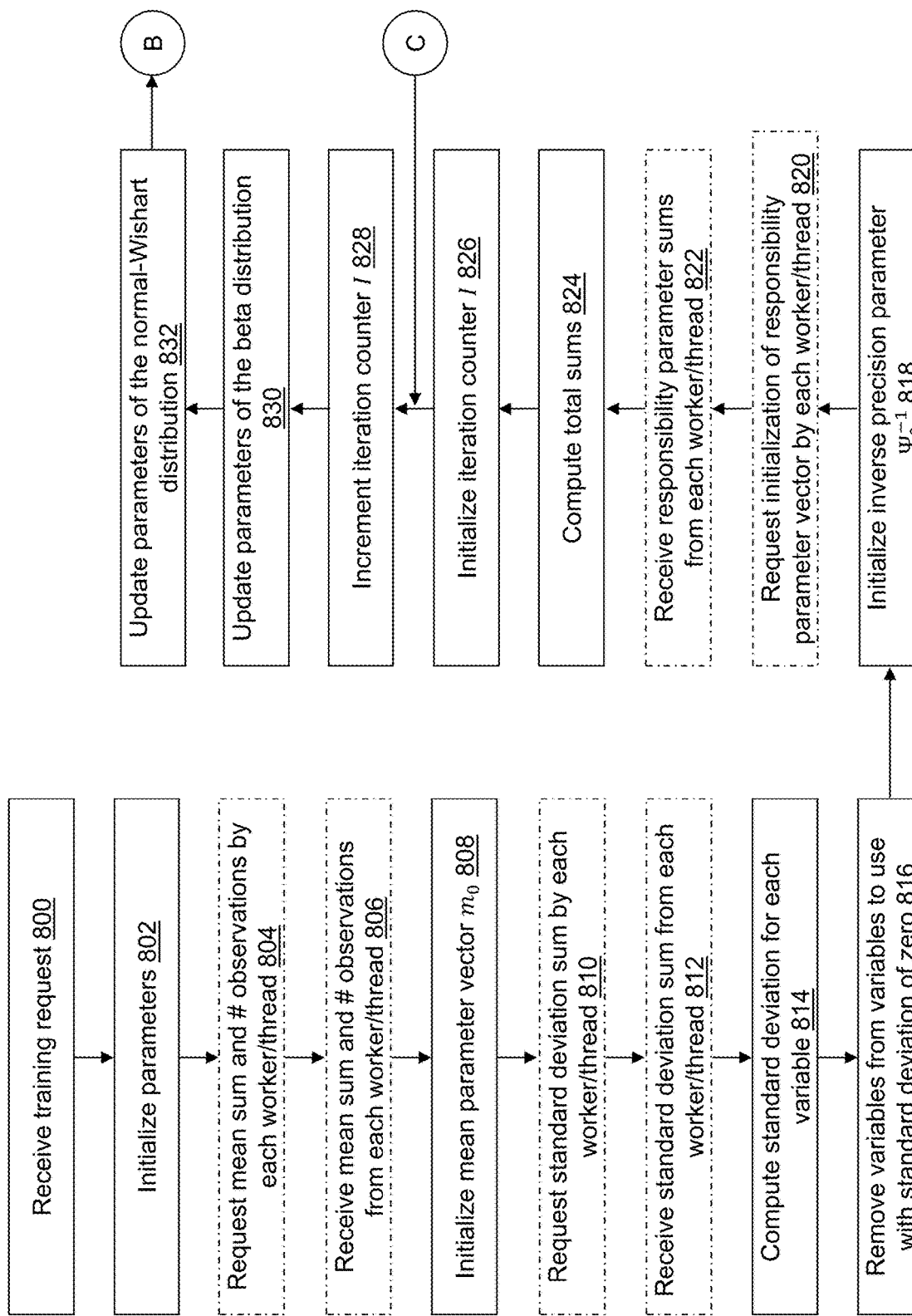
FIGS. 8A and 8B depicts a flow diagram illustrating examples of operations performed by the controller device of FIG. 5 in accordance with an illustrative embodiment.
Figure 8B:
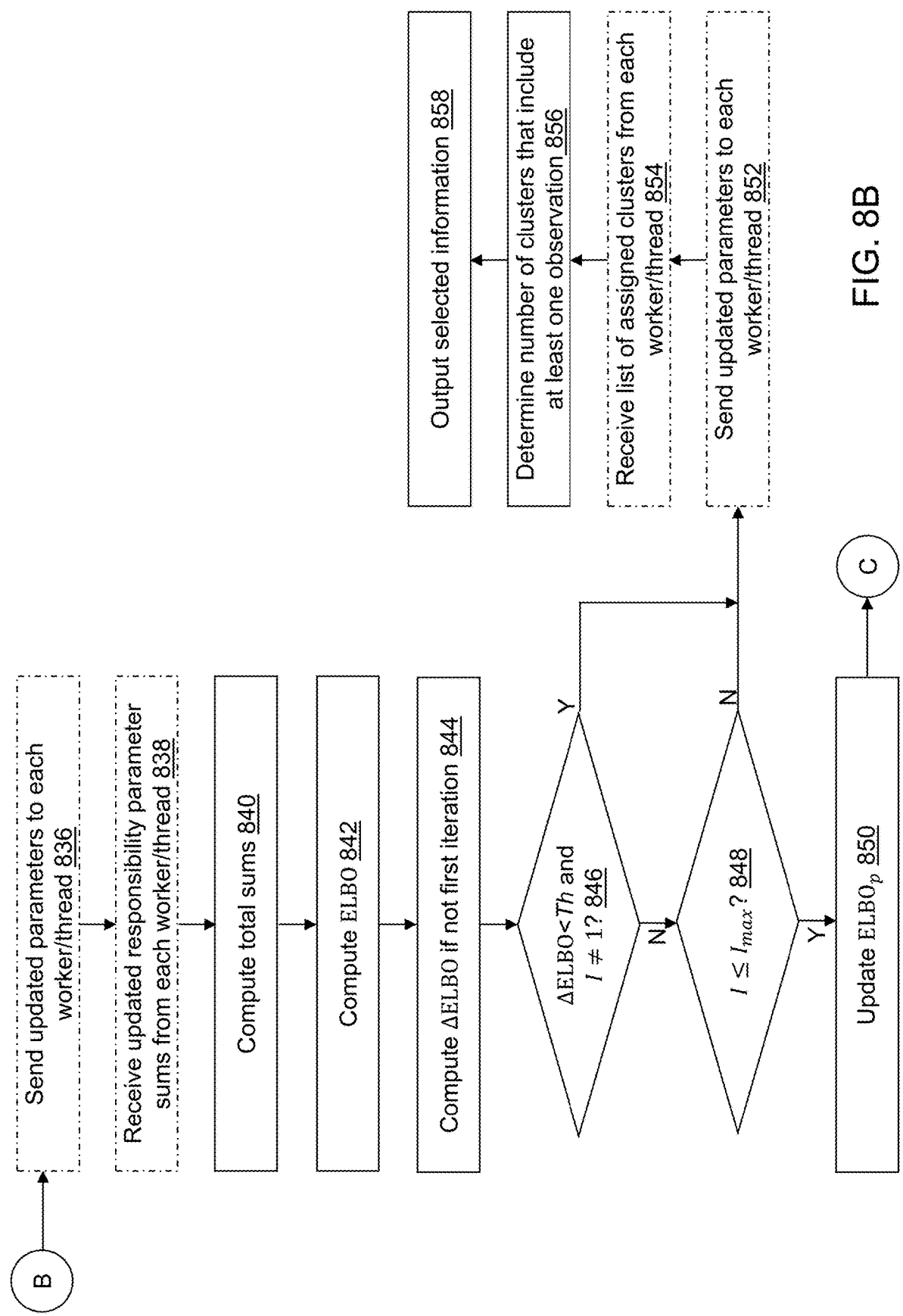

Referring to FIGS. 8A and 8B, example operations associated with controller application 512 are described. Additional, fewer, or different operations may be performed depending on the embodiment. The order of presentation of the operations of FIGS. 8A and 8B is not intended to be limiting. Again, controller application 512 and clustering model training application 422 may be integrated or be the same applications so that the operations of FIG. 7 and FIGS. 8A and 8B are merged.

In an operation 800, the training request may be received from user device 400 or directly from the user of user device 400 when controller device 304 and user device 400 are integrated in the same computing device.

In an operation 802, values for the parameters indicated in operations 200 to 220 may be received from user device 400 or directly from the user of user device 400 when integrated or read from a known storage location.

In an operation 804, a request is sent to each thread of each worker device 400 of worker system 306 and/or to each thread of controller device 304. The request indicates that each worker/thread compute mean sums $\Sigma_{i=1}^{n_{w,t}} x_i$ and a number of observation vectors $n_{w,t}$ for input data subset 514 allocated to each thread of controller device 304 and/or input data subset 614 distributed to each worker device 400 and allocated to each thread of worker device 400 where the subscript w indicates an index to the respective worker device 400, and t indicates an index to the respective thread of the respective worker device 400. When controller device 304 is included as a worker device, W is incremented using W=W+1 to indicate that the values computed by each thread of controller device 304 on each input data subset 514 are included in the summations below. The request is sent by a controller thread of controller device 304. The request may include the initialization option, the percentage value p, and the number of observations value $$\frac{N_b}{W*T}.$$

In an operation 806, the computed $\Sigma_{i=1}^{n_{w,t}} x_i$ and $n_{w,t}$ are received from each thread of each worker device 400 of worker system 306 and/or from each thread of controller device 304. The values are received by the controller thread of controller device 304. The $\Sigma_{i=1}^{n_{w,t}} x_i$ received from each worker/thread may be denoted as $m_{w,t}$, where the subscript w indicates an index to the respective worker device 400 and/or controller device 304, t indicates an index to the respective thread of the respective worker device 400 and/or controller device 304, and $m_{w,t}$ is a vector with d values.

Similar to operation 232, in an operation 808, the third normal-Wishart distribution parameter vector $m_0$ is initialized using $m_{0,j}=m_j, j=1, 2, \ldots, d$, where $$m_j = \frac{1}{n} \sum_{w=1}^{W} \sum_{t=1}^{T} m_{w,t,j}, \; j = 1, 2, \ldots, d,$$

and $N_b = \Sigma_{w=1}^{W} \Sigma_{t=1}^{T} n_{w,t}$.

In an operation 810, a request is sent to each thread of each worker device 400 of worker system 306 and/or to each thread of controller device 304 that includes $m_0$. The request indicates that each worker/thread compute a standard deviation sum $\Sigma_{i=1}^{n_{w,t}} (x_i - m_0)(x_i - m_0)^\tau$ for input data subset 514 allocated to each thread of controller device 304 and/or input data subset 614 distributed to each worker device 400 and allocated to each thread of worker device 400 where the subscript w indicates an index to the respective worker device 400, and t indicates an index to the respective thread of the respective worker device 400.

In an operation 812, the standard deviation sum $\Sigma_{i=1}^{n_{w,t}} (x_i-m_0)(x_i-m_0)^\tau$ is received from each thread of each worker device 400 of worker system 306 and/or from each thread of controller device 304. The values are received by the controller thread of controller device 304. The $\Sigma_{i=1}^{n_{w,t}} (x_i-m_0)(x_i-m_0)^\tau$ received from each worker/thread may be denoted as $p_{w,t}$, where the subscript w indicates an index to the respective worker device 400 and/or controller device 304, t indicates an index to the respective thread of the respective worker device 400 and/or controller device 304, and $p_{w,t}$ is a vector with d values.

In an operation 814, a standard deviation value is computed for each variable. The standard deviation value is computed using $$\sigma_j = \sqrt{\frac{p_j}{n-1}}, j = 1, 2, \ldots, d,$$

where $p_j = \Sigma_{w=1}^{W} \Sigma_{t=1}^{T} p_{w,t,j}$, j=1, 2, . . . , d.

Similar to operation 230, in an operation 816, any variable of the plurality of variables that has a standard deviation value of zero (c i=0) is removed from the plurality of variables, and the number of variables d is reduced based on a number of variables removed.

In an operation 818, the fourth normal-Wishart distribution parameter vector $\Psi_0^{-1}$ is initialized using $$\Psi_0^{-1} = \frac{p_j}{n-1}.$$

In an operation 820, a request is sent to each thread of each worker device 400 of worker system 306 and/or to each thread of controller device 304. The request indicates that each worker/thread compute initial values for responsibility parameter sums $\Sigma_{i=1}^{n_{w,t}} r_{i,k}$, $\Sigma_{i=1}^{n_{w,t}} r_{i,k} x_i$, and $\Sigma_{i=1}^{n_{w,t}} r_{i,k} x_i x_i^\tau$ for each cluster k=1, . . . , $K_{max}$ and for input data subset 514 allocated to each thread of controller device 304 and/or input data subset 614 distributed to each worker device 400 and allocated to each thread of worker device 400. In an illustrative embodiment, the request may be broadcast to each worker device 400. The request is sent by the controller thread of controller device 304. The request may include the value for $K_{max}$.

In an operation 822, the responsibility parameter sums $\Sigma_{i=1}^{n_{w,t}} r_{i,k}$, $\Sigma_{i=1}^{n_{w,t}} r_{i,k} x_i$, and $\Sigma_{i=1}^{n_{w,t}} r_{i,k} x_i x_i^\tau$ are received from each thread of each worker device 400 of worker system 306 and/or from each thread of controller device 304. The values are received by the controller thread of controller device 304. The $\Sigma_{i=1}^{n_{w,t}} r_{i,k}$ received from each worker/thread may be denoted as $q_{k,w,t}$, where $q_{k,w,t}$ is a scalar value and the subscript k indicates an index to the respective cluster, the subscript w indicates an index to the respective worker device 400 and/or controller device 304, and t indicates an index to the respective thread of the respective worker device 400 and/or controller device 304. The $\Sigma_{i=1}^{n_{w,t}} r_{i,k} x_i$ received from each worker/thread may be denoted as $u_{k,w,t}$, which is a d-dimensional vector. The $\Sigma_{i=1}^{n_{w,t}} r_{i,k} x_i x_i^\tau$ received from each worker/thread may be denoted as $s_{k,w,t}$ that is a d by d-dimensional matrix.

In an operation 824, the total sum of each responsibility parameter sum is computed using $q_k = \Sigma_{w=1}^{W} \Sigma_{t=1}^{T} q_{k,w,t}$, $u_k = \Sigma_{w=1}^{W} \Sigma_{t=1}^{T} u_{k,w,t}$, $s_k = \Sigma_{w=1}^{W} \Sigma_{t=1}^{T} s_{k,w,t}$, k=1, 2, . . . , $K_{max}$.

In an operation 826, the iteration counter I is initialized, for example, as I=0.

In an operation 828, the iteration counter I is incremented, for example, as I=I+1.

In an operation 830, parameters $\gamma_{k,1}$ and $\gamma_{k,2}$ of the beta distribution are updated for each cluster k=1, 2, . . . , $K_{max}$. For example, $\gamma_{k,1} = 1 + q_k$, k=1, 2, . . . , $K_{max}$ and $\gamma_{k,2} = \alpha_0 + \Sigma_{l=k+1}^{K_{max}} q_l$, k=1, 2, . . . , $K_{max}$.

In an operation 832, parameters $m_k$, $\beta_k$, $\Psi_k$, $v_k$ or $m_k$, $\beta_k$, $\Psi$, $v$ of the normal-Wishart distribution are updated for each cluster k=1, 2, . . . , $K_{max}$, for example, using $$m_k = \frac{\beta_0 m_0 + u_k}{\beta_0 + q_k},$$

$$\beta_k = \beta_0 + q_k,$$

$$v = v_0 + \sum_{k=1}^{K_{max}} q_k, \text{ and}$$

$$\Psi = \left(\Psi_0^{-1} + \sum_{k=1}^{K_{max}} \beta_0(m_k - m_0)(m_k - m_0)^\top + \sum_{k=1}^{K_{max}} (s_k - u_k m_k^\top - m_k u_k^\top + q_k m_k m_k^\top)\right)^{-1}$$

when the covariance option indicates the "linked model" mixture model is used, and using $$m_k = \frac{\beta_0 m_0 + u_k}{\beta_0 + q_k},$$

$$\beta_k = \beta_0 + q_k,$$

$$v_k = v_0 + q_k, \text{ and}$$

$$\Psi_k = (\Psi_0^{-1} + \beta_0(m_k - m_0)(m_k - m_0)^\top + s_k - u_k m_k^\top - m_k u_k^\top + q_k m_k m_k^\top)^{-1}$$

otherwise. Processing continues in an operation 836 shown referring to FIG. 8B.

In operation 836, a request is sent to each thread of each worker device 400 of worker system 306 and/or to each thread of controller device 304. The request indicates that each worker/thread compute updated responsibility parameter sums for each cluster k=1, 2, . . . , $K_{max}$ and for input data subset 514 allocated to each thread of controller device 304 and/or input data subset 614 distributed to each worker device 400 and allocated to each thread of worker device 400. The request includes the updated beta distribution parameters $\gamma_{k,1}$ and $\gamma_{k,2}$ and the updated normal-Wishart distribution parameters $m_k$, $\beta_k$, $\Psi_k$, $v_k$ or $m_k$, $\beta_k$, $\Psi$, $v$, when the covariance option indicates the "linked model" mixture model is used. In an illustrative embodiment, the request may be broadcast to each worker device 400. The request is sent by the controller thread of controller device 304.

In an operation 838, the updated responsibility parameter sums, $\Sigma_{i=1}^{n_{w,t}} r_{i,k}$, $\Sigma_{i=1}^{n_{w,t}} r_{i,k} x_i$, $\Sigma_{i=1}^{n_{w,t}} r_{i,k} x_i x_i^\tau$, and the $B_{x_i}$ contribution, are received from each thread of each worker device 400 of worker system 306 and/or from each thread of controller device 304. The values are received by the controller thread of controller device 304. The $\Sigma_{i=1}^{n_{w,t}} r_{i,k}$ received from each worker/thread may be denoted as $q_{k,w,t}$, where the subscript k indicates an index to the respective cluster, the subscript w indicates an index to the respective worker device 400 and/or controller device 304, and t indicates an index to the respective thread of the respective worker device 400 and/or controller device 304. The $\Sigma_{i=1}^{n_{w,t}} r_{i,k} x_i$ received from each worker/thread may be denoted as $u_{k,w,t}$. The $\Sigma_{i=1}^{n_{w,t}} r_{i,k} x_i x_i^\tau$ received from each worker/thread may be denoted as $s_{k,w,t}$. The $e_k$ received from each worker/thread may be denoted as $e_{k,w,t}$.

In an operation 840, the total sum of each updated responsibility parameter sum is computed using $q_k = \Sigma_{w=1}^W \Sigma_{t=1}^T q_{k,w,t}$, $u_k = \Sigma_{w=1}^W \Sigma_{t \times 1}^T u_{k,w,t}$, $s_k = \Sigma_{w=1}^W \Sigma_{t=1}^T s_{k,w,t}$, and $e_k = \Sigma_{w=1}^W \Sigma_{t=1}^T e_{k,w,t}$.

Similar to operation 250, in an operation 842, the ELBO value is computed, where $B_{x_i} = e_k$.

In an operation 844, ΔELBO is computed using ΔELBO=|ELBO−ELBO$_p$| unless the iteration counter I=1. When the iteration counter I=1, a value for ELBO$_p$ has not been determined.

In an operation 846, a determination is made concerning whether ΔELBO<Th. If ΔELBO<Th and I≠1, processing continues in an operation 852 to indicate convergence has been achieved. If ΔELBO≥Th or I=1, processing continues in an operation 848.

In operation 848, a determination is made concerning whether I≤I$_{max}$. If I>I$_{max}$, processing continues in operation 852 to indicate convergence has been stopped. If I≤I$_{max}$, processing continues in an operation 850.

In operation 850, ELBO$_p$ is updated for a next iteration using ELBO$_p$=ELBO, and processing continues in operation 828.

In operation 852, a request is sent to each thread of each worker device 400 of worker system 306 and/or to each thread of controller device 304. The request indicates that each worker/thread update responsibility parameter $r_{i,k}$ for each cluster k=1, 2, . . . , K$_{max}$ and for each observation vector of input data subset 514 allocated to each thread of controller device 304 and/or input data subset 614 distributed to each worker device 400 and allocated to each thread of worker device 400. The request further indicates that each worker/thread determine a cluster membership based on the updated responsibility parameter $r_{i,k}$ for each cluster k=1, 2, . . . , K$_{max}$. The request includes the updated beta distribution parameters $\gamma_{k,1}$ and $\gamma_{k,2}$ and the updated normal-Wishart distribution parameters $m_k$, $\beta_k$, $\Psi_k$, $v_k$ or $m_k$, $\beta_k$, $\Psi$, $v$, when the covariance option indicates the "linked model" mixture model is used. In an illustrative embodiment, the request may be broadcast to each worker device 400. The request is sent by the controller thread of controller device 304.

In an operation 854, a list of clusters to which at least one observation was assigned is received from each thread of each worker device 400 of worker system 306 and/or from each thread of controller device 304. The values are received by the controller thread of controller device 304. The list from each worker device 400 of worker system 306 and/or from each thread of controller device 304 may be combined into a single list that includes unique cluster identifiers to which any observation vector has been assigned.

In an operation 856, a number of clusters K$_n$ that include at least one observation is determined from the list of clusters received in operation 854. For example, K$_n$ is a number of unique cluster membership indices to which any observation vector is assigned.

In an operation 858, the ELBO, $m_k$, and $\Psi_k$ computed for each cluster k=1, 2, . . . , K$_n$ of the number of clusters K$_n$ are output. Additional information that may be output are a number of observations in each cluster, a neighbor cluster of each cluster whose Gaussian mean is closest to the Gaussian mean of the cluster, the cluster membership index $z_i$ for each observation, the responsibility parameter value $r_{i,k}$ for each observation and each cluster, a clustering model description so that the model can be used for data clustering, etc. For example, the clustering model description may be output to clustering model description 126, and the cluster membership index $z_i$ for each observation and the responsibility parameter value $r_{i,k}$ for each observation and each cluster may be output to clustering model output data 128. The clustering model description may include the clustering algorithm indicating the Gaussian mixture model, the inference method indicating SVB, the number of clusters K$_n$, the mass parameter value $\alpha_0$, the covariance option, the maximum number of iterations I$_{max}$, the convergence threshold value Th, ELBO, $m_k$, and $\Psi_k$ computed for each cluster k=1, . . . , K$_n$ of the number of clusters K$_n$, etc. Some of the output may be generated from each worker/thread to avoid transmission of the data through network 308.

Referring to FIGS. 9A, 9B, 9C, 9D, and 9E, example operations associated with worker application 612 are described. Additional, fewer, or different operations may be performed depending on the embodiment. The order of presentation of the operations of FIGS. 9A, 9B, 9C, 9D, and 9E is not intended to be limiting. When controller device 304 is acting as a worker device, each thread of the number of threads T of controller device 304 also executes the operations of FIGS. 9A, 9B, 9C, 9D, and 9E with the assigned input data subset 514.

Referring to FIG. 9A, in an operation 900, the request to compute mean sums and the number of observation vectors for a batch of observation vectors selected from input data subset 614 or input data subset 514 is received from controller device 304 as a result of operation 804. The request may include the initialization option, the percentage value p and a local batch size N$_{bl}$ or the values may be otherwise provided to each worker/thread in a known memory location or based on a default value.

In an operation 902, the number of selected observations n is initialized, for example, as n=1, an observation counter i is initialized, for example, as i=0, and the sum values m are initialized, for example, as m=0, where m is a vector with d values.

In an operation 903, the observation counter is incremented, for example, as i=i+1.

In an operation 904, an observation vector $x_i$ is read from input data subset 614 allocated to the respective thread of worker device 400 or from input data subset 514 allocated to the respective thread of controller device 304. In an illustrative embodiment, the read data is stored in memory so that no further read of input data subset 614 allocated to the respective thread of worker device 400 or from input data subset 514 allocated to the respective thread of controller device 304 is performed.

In an operation 906, a determination is made concerning whether the initialization option indicates that the batch size is used to initialize the mean parameter. When the initialization option is true, processing continues in an operation 908. When the initialization option is false, processing continues in an operation 912.

In operation 908, a random draw from a binary distribution with the percentage value p as an input parameter is performed to define a random draw value that may be zero or one.

In operation 910, a determination is made concerning whether to include the read observation vector $x_i$ in the batch based on the random draw value. For example, a random draw value of one may indicate to include the read observation vector $x_i$ in the batch. When the random draw value is one, processing continues in operation 912 to include the read observation vector $x_i$ in the batch. When the random draw value is not one, processing continues in operation 903 to process a next observation vector.

In operation 912, an indicator is stored to indicate that the observation vector was selected. For example, an index to the read observation vector $x_i$ is stored in in an index array or list l such as $l_n$=i so that a mapping between observations selected in the batch is maintained to a respective observation in input dataset 124.

In an operation 914, the read observation vector $x_i$ is added to the mean sum m using $m=m+x_i$.

In an operation 916, the number of selected observations n is incremented, for example, as n=n+1.

In an operation 918, a determination is made concerning whether processing is done. For example, when $n \geq N_{bl}$, processing is done because the batch processing is complete. If $n \geq N_{bl}$, processing continues in an operation 919. If $n \leq N_{bl}$, processing continues in operation 903 to process a next observation vector.

In operation 919, m and n are sent from each thread of each worker device 400 of worker system 306 or from each thread of controller device 304 to controller device 304, and processing continues in operation 806 of FIG. 8A. A total number of observation vectors $N_T$ included in input data subset 614 allocated to the respective thread of worker device 400 or from input data subset 514 allocated to the respective thread of controller device 304 may be stored as $N_T$=i.

Referring to FIG. 9B, in an operation 920, the request to compute the standard deviation sum for input data subset 614 or input data subset 514 is received from controller device 304 as a result of operation 810. The request may include the mean vector $m_0$ or the value may be otherwise provided to each worker/thread in a known memory location or based on a default value.

In an operation 921, the sum values p are initialized, for example, as p=0, where p is a matrix with $N_b \times d$ values, an observation counter i=0, and a selected counter j=1.

In an operation 922, the observation counter i is incremented, for example, using i=i+1.

In an operation 923, an observation vector $x_i$ is selected from input data subset 614 allocated to the respective thread of worker device 400 or from input data subset 514 allocated to the respective thread of controller device 304. When the data read in operation 904 is not stored in memory the observation vector $x_i$ is read.

In an operation 924, a determination is made concerning whether the observation vector $x_i$ was included in the batch selected to compute the mean. If the observation vector $x_i$ was included in the batch selected to compute the mean, processing continues in an operation 925. Otherwise, processing continues in operation 922 to select a next observation vector. For example, when i matches a next value on index array or list l, the observation vector $x_i$ was included in the batch selected to compute the mean. For example, when $l_j$=i need the observation vector $x_i$ was included in the batch selected to compute the mean.

In operation 925, a standard deviation contribution to the sum value is added, for example, using $p=p+(x_i-m_0)(x_i-m_0)^\tau$.

In an operation 926, the selected counter j is incremented, for example, using j=j+1.

In an operation 927, a determination is made concerning whether processing is done. For example, when $j \geq N_{bl}$, processing is done because the batch processing is complete. If $j \geq N_{bl}$, processing continues in an operation 928. If $j \leq N_{bl}$, processing continues in operation 922 to select a next observation vector.

In operation 928, p is sent from each thread of each worker device 400 of worker system 306 or from each thread of controller device 304 to controller device 304, and processing continues in operation 812 of FIG. 8A.

Figure 9C:
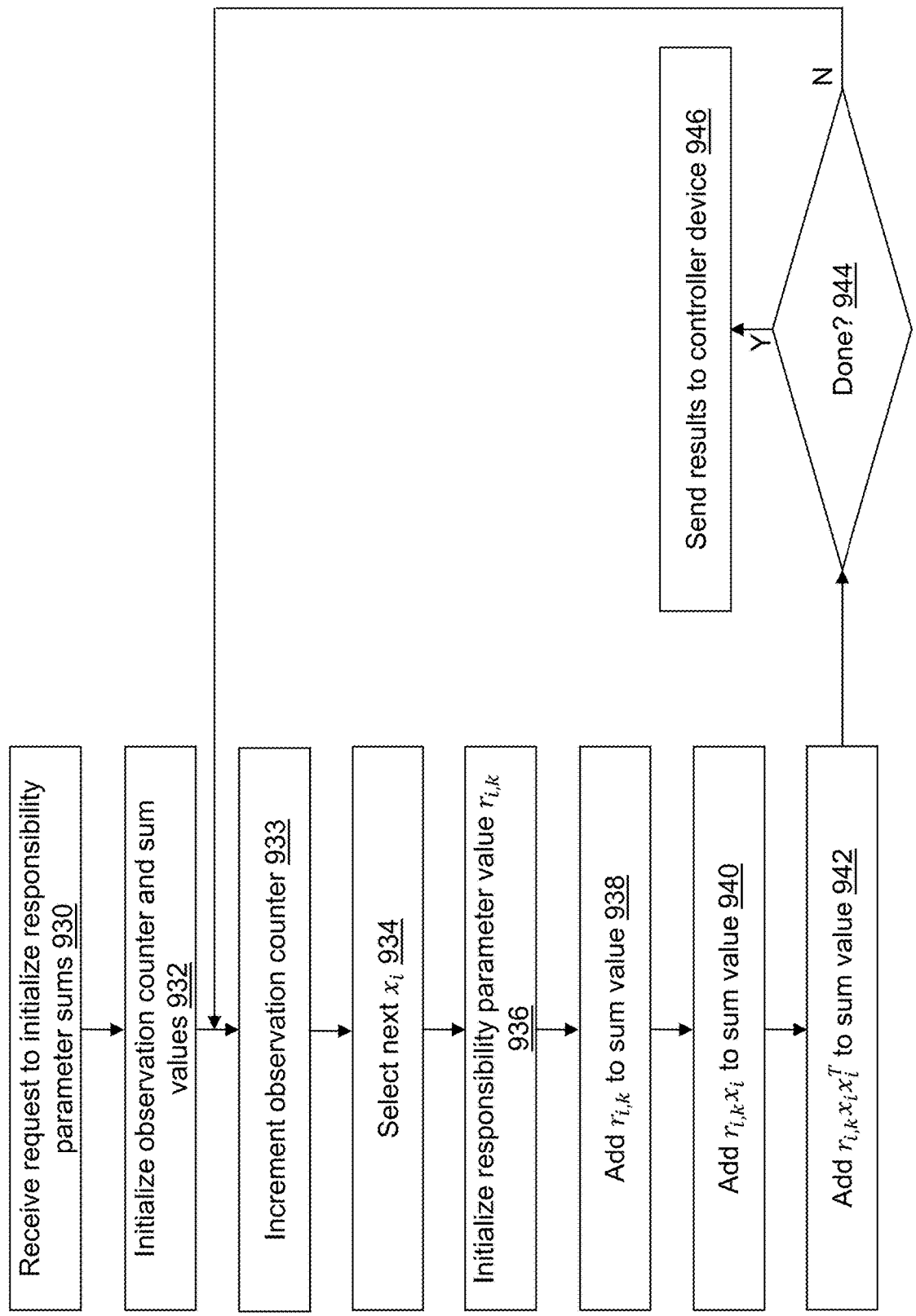

Referring to FIG. 9C, in an operation 930, the request to compute initial values for the responsibility parameter sums for input data subset 614 or input data subset 514 and for each cluster k=1, . . . , $K_{max}$ is received from controller device 304 as a result of operation 820. The request may include the value for $K_{max}$ or the value may otherwise be provided to each worker/thread in a known memory location or based on a default value.

In an operation 932, an observation counter i is initialized, for example, as i=0, and the sum values $q_k$, $u_k$, and $s_k$ are initialized, for example, as $q_k$=0, $u_k$=0, and $s_k$=0, for k=1, 2, . . . , $K_{max}$.

In an operation 933, the observation counter i is incremented, for example, using i=i+1.

In an operation 934, an observation vector $x_i$ is selected that was read previously from input data subset 614 allocated to the respective thread of worker device 400 or from input data subset 514 allocated to the respective thread of controller device 304.

In an operation 936, a responsibility parameter value $r_{i,k}$ is initialized for each cluster. For illustration, the responsibility parameter value $r_{i,k}$ may be initialized using draws from a multinomial distribution such that a probability that observation vector $x_i$ is assigned to each cluster k=1, 2, . . . , $K_{max}$ sums to one or $\Sigma_{k=1}^{K_{max}} r_{i,k}=1$. As another illustration, the responsibility parameter value $r_{i,k}$ may be initialized using $r_{i,k}=1/K_{max}$, k=1, 2, . . . , $K_{max}$.

In an operation 938, $q_k=q_k+r_{i,k}$ is computed for each cluster k=1, 2, . . . , $K_{max}$.

In an operation 940, $u_k=u_k+r_{i,k}x_i$ is computed for each cluster k=1, 2, . . . , $K_{max}$ In an operation 942, $s_k=s_k+r_{i,k}x_i \times l$ is computed for each cluster k=1, 2, . . . , $K_{max}$, and is a matrix.

In an operation 944, a determination is made concerning whether processing is done. For example, when $i \geq N_T$, processing is done because all of the observation vectors included in input data subset 614 allocated to the respective thread of worker device 400 or from input data subset 514 allocated to the respective thread of controller device 304 have been processed. If $i \geq N_T$, processing continues in an operation 946. If $i < N_T$, processing continues in operation 933 to process a next observation vector.

In operation 946, $q_k$, $u_k$, and $s_k$ are sent from each thread of each worker device 400 of worker system 306 or from each thread of controller device 304 to controller device 304, and processing continues in operation 822 of FIG. 8A.

Referring to FIG. 9D, in an operation 950, the request to compute updated values for the responsibility parameter sums for input data subset 614 and for each cluster k=1, 2, . . . , $K_{max}$ is received from controller device 304 as a result of operation 836. The request may include the updated beta distribution parameters $\gamma_{k,1}$ and $\gamma_{k,2}$ and the updated normal-Wishart distribution parameters $m_k$, $\beta_k$, $\Psi_k$, $v_k$ or $m_k$, $\beta_k$, W, when the covariance option indicates the "linked model" mixture model is used, or the values may be otherwise provided to each worker/thread in a known memory location, for example.

In an operation 952, the selected observations counter j is initialized, for example, as j=1, an observation counter i is initialized, for example, as i=0, and the sum values $q_k$, $u_k$, $s_k$, and $e_k$ are initialized, for example, as $q_k$=0, $u_k$=0, $e_k$=0, and $s_k$=0, for k=1, 2, . . . , $K_{max}$ In an operation 953, the observation counter is incremented, for example, as i=i+1.

In an operation 954, an observation vector $x_i$ is selected that was read previously from input data subset 614 allocated to the respective thread of worker device 400 or from input data subset 514 allocated to the respective thread of controller device 304.

In an operation 956, a random draw from a binary distribution with the percentage value p as an input parameter is performed to define a random draw value that may be zero or one.

In an operation 958, a determination is made concerning whether to include the selected observation vector $x_i$ in the batch based on the random draw value. For example, a random draw value of one may indicate to include the selected observation vector $x_i$ in the batch. When the random draw value is one, processing continues in operation 960 to include the selected observation vector $x_i$ in the batch. When the random draw value is not one, processing continues in operation 953 to select a next observation vector.

In operation 960, the responsibility parameter value $r_{i,k}$ is updated for each cluster k=1, 2, . . . , $K_{max}$. For example, $$r_{i,k} \propto \exp(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) +$$
$$\frac{1}{2}\Gamma_d^{(1)}\left(\frac{v}{2}\right) + \frac{1}{2}\log|\Psi| - \frac{1}{2}(x_i - m_k)^T v\Psi(x_i - m_k) - \frac{d}{2}\beta_k^{-1}$$

when the covariance option indicates the "linked model" mixture model is used, and using $$r_{i,k} \propto \exp\left(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) + \right.$$
$$\left. \frac{1}{2}\Gamma_d^{(1)}\left(\frac{v_k}{2}\right) + \frac{1}{2}\log|\Psi_k| - \frac{1}{2}(x_i - m_k)^T v_k\Psi_k(x_i - m_k) - \frac{d}{2}\beta_k^{-1}\right)$$

otherwise, where $\Gamma^{(1)}$ indicates a digamma function that is a derivative function of a logarithm of a gamma function, and $\Gamma_d^{(1)}$ indicates a d dimensional digamma function.

In an operation 962, $q_k = q_k + r_{i,k}$ is computed for each cluster k=1, 2, . . . , $K_{max}$.

In an operation 964, $u_k = u_k + r_{i,k} x_i$ is computed for each cluster k=1, 2, . . . , $K_{max}$.

In an operation 965, $s_k = s_k + r_{i,k} x_i x_i^T$ is computed for each cluster k=1, 2, . . . , $K_{max}$.

In an operation 966, a $B_{x_i}$ contribution $$e_k = e_k +$$
$$r_{i,k}\left(-\frac{d}{2}\log\pi + \frac{1}{2}\Gamma_d^{(1)}\left(\frac{v}{2}\right) + \frac{1}{2}\log|\Psi| - \frac{1}{2}(x_i - m_k)^T v\Psi(x_i - m_k) - \frac{d}{2}\beta_k^{-1}\right)$$

is computed for each cluster k=1, 2, . . . , $K_{max}$, when the covariance option indicates the "linked model" mixture model is used, and using $$e_k = e_k + r_{i,k}\left(-\frac{d}{2}\log\pi + \frac{1}{2}\Gamma_d^{(1)}\left(\frac{v_k}{2}\right) + \frac{1}{2}\log|\Psi_k| - \right.$$

$$\left. \frac{1}{2}(x_i - m_k)^T v_k\Psi_k(x_i - m_k) - \frac{d}{2}\beta_k^{-1}\right)$$

otherwise.

In an operation 967, the selected observations counter j is incremented, for example, using j=j+1.

In an operation 968, a determination is made concerning whether processing is done. For example, when j≥$N_{bl}$, processing is done because the batch processing is complete. If j≥$N_{bl}$, processing continues in an operation 969. If j≤$N_{bl}$, processing continues in operation 953 to process a next observation vector.

In operation 969, $q_k$, $u_k$, $s_k$, and $e_k$ are sent from each thread of each worker device 400 of worker system 306 or from each thread of controller device 304 to controller device 304, and processing continues in operation 838 of FIG. 8B.

Figure 9E:
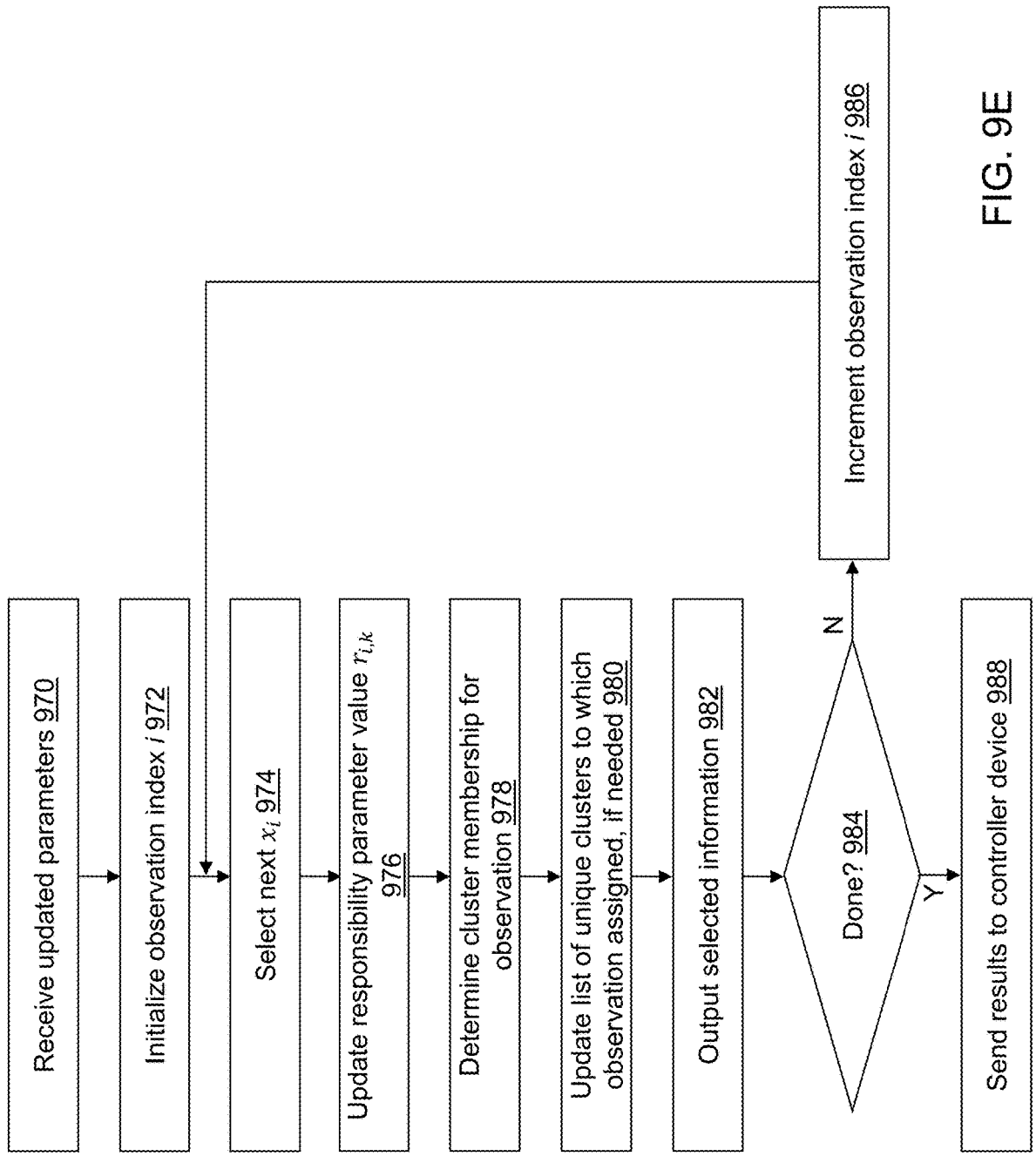

Referring to FIG. 9E, in an operation 970, the request to update responsibility parameter $r_{i,k}$ for each cluster k=1, 2, . . . , $K_{max}$ and to determine a cluster membership for each observation vector is received from controller device 304 as a result of operation 852. The request includes the updated beta distribution parameters $\gamma_{k,1}$ and $\gamma_{k,2}$ and the updated normal-Wishart distribution parameters $m_k$, $\beta_k$, $\Psi_k$, $v_k$ or $m_k$, $\beta_k$, $\Psi$, $v$, when the covariance option indicates the "linked model" mixture model is used. In an illustrative embodiment, the request may be broadcast to each worker device 400. The request is sent by the controller thread of controller device 304

In an operation 972, an observation index i is initialized, for example, as i=1.

In an operation 974, an observation vector $x_i$ is selected that was read previously from input data subset 614 allocated to the respective thread of worker device 400 or from input data subset 514 allocated to the respective thread of controller device 304.

Similar to operation 260, in an operation 976, the responsibility parameter value $r_{i,k}$ is updated for each cluster k=1, 2, . . . , $K_{max}$. For example, $$r_{i,k} \propto \exp(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) +$$
$$\frac{1}{2}\Gamma_d^{(1)}\left(\frac{v}{2}\right) + \frac{1}{2}\log|\Psi| - \frac{1}{2}(x_i - m_k)^T v\Psi(x_i - m_k) - \frac{d}{2}\beta_k^{-1}$$

when the covariance option indicates the "linked model" mixture model is used, and using $$r_{i,k} \propto \exp\left(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) + \right.$$
$$\left. \frac{1}{2}\Gamma_d^{(1)}\left(\frac{v_k}{2}\right) + \frac{1}{2}\log|\Psi_k| - \frac{1}{2}(x_i - m_k)^T v_k\Psi_k(x_i - m_k) - \frac{d}{2}\beta_k^{-1}\right)$$

otherwise, where $\Gamma^{(1)}$ indicates a digamma function that is a derivative function of a logarithm of a gamma function, and $\Gamma_d^{(1)}$ indicates a d dimensional digamma function. When p=1 or 100%, the responsibility parameter value $r_{i,k}$ need not be updated because the responsibility parameter value $r_{i,k}$ has already been updated for each observation vector included in input dataset 124 in operation 960.

Similar to operation 262, in an operation 978, a cluster membership index $z_i$ is determined using a multinomial distribution with the updated responsibility parameter value $r_{i,k}$ as the parameter value. The cluster membership index $z_i$ indicates a cluster to which the $i^{th}$ observation vector $x_i$ is assigned. For example, a random draw is made and compared to each probability value defined by $r_{i,k}$ to determine the cluster membership index $z_i$ that is one of k=1, 2, . . . , $K_{max}$.

In an operation 980, the unique cluster list is updated to include the cluster membership index $z_i$ if the $i^{th}$ observation vector $x_i$ is the first observation vector to be assigned to the cluster indicated by the cluster membership index $z_i$.

In an operation 982, the cluster membership index $z_i$ may be output, for example, to clustering model output data 128 in association with the observation vector by outputting the observation index i and/or the $i^{th}$ observation vector $x_i$, for example, with the cluster membership index $z_i$.

In an operation 984, a determination is made concerning whether processing is done. For example, when i≥$N_T$, processing is done because all of the observation vectors included in input data subset 614 allocated to the respective thread of worker device 400 or from input data subset 514 allocated to the respective thread of controller device 304 have been processed. If i≥$N_T$, processing continues in an operation 988. If i<$N_T$, processing continues in an operation 986.

In operation 986, the observation index i is incremented, for example, as i=i+1, and processing continues in operation 974.

In operation 988, the unique cluster list is sent from each thread of each worker device 400 of worker system 306 to controller device 304, and processing continues in operation 854 of FIG. 8B.

Figure 10B:
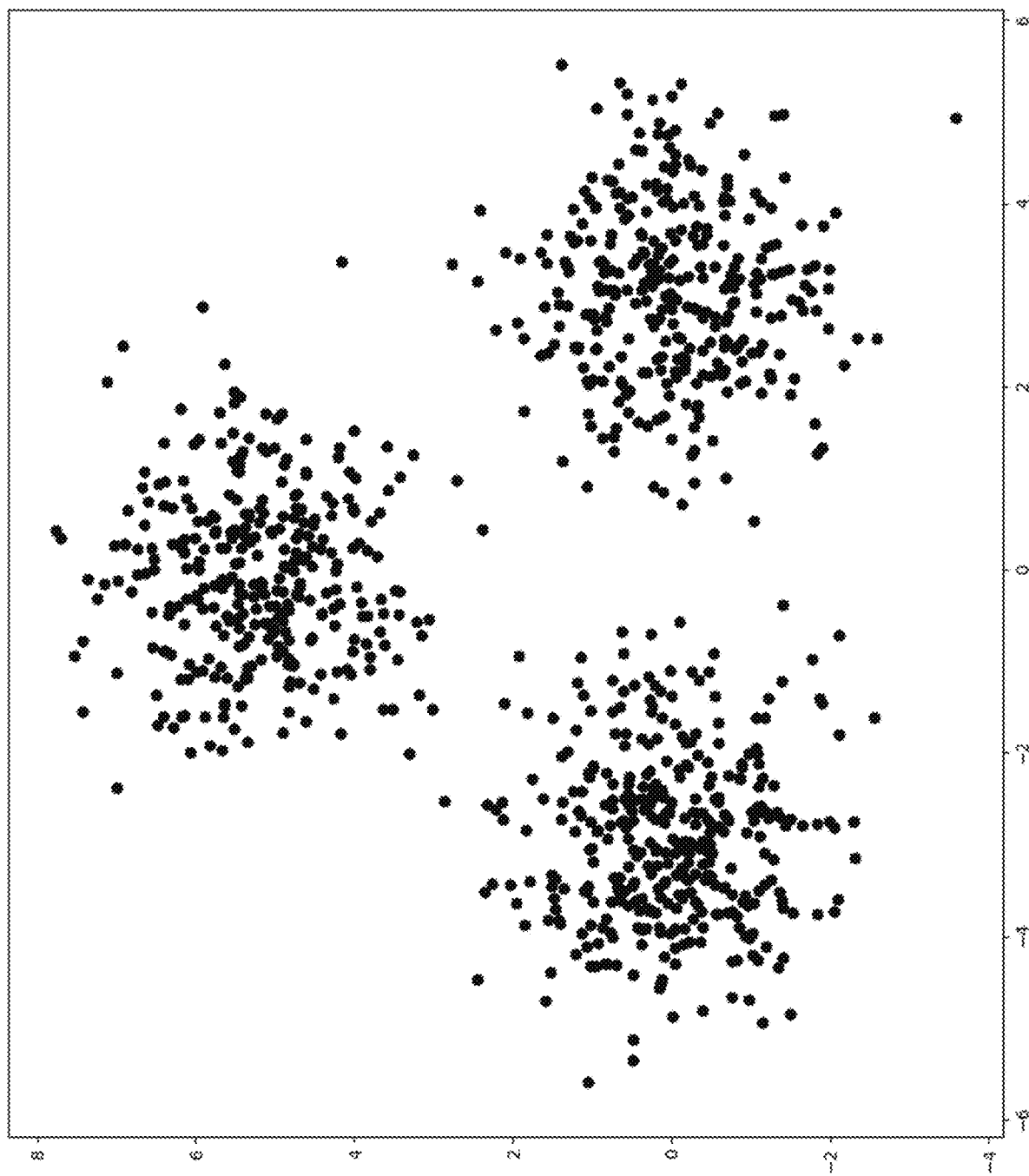
FIG. 10B shows a batch of data from the first sample dataset in accordance with an illustrative embodiment.

Experimental results were generated using the operations of clustering model training application 122. Input dataset 124 included 10,000 observation vectors distributed into three clusters. The three clusters were centered at [0, 3 √3], [−3, 0], and [3, 0], respectively. The covariance matrix was defined as [0.9, 0; 0, 0.9] for all of the three clusters. Thus, the three clusters had the same shape and formed an equilateral triangle of the centers. Referring to FIG. 10A, the three clusters are shown. Referring to FIG. 10B, a batch for s single iteration of operations 240 through 258 is shown with the percentage value p=0.1 and the number of observations value $N_b$=1000. Even using just 10% of the 10,000 observation vectors, the centers and shapes of the clusters are maintained in the batch, based on which the means and covariances of the Gaussians can be well inferred by using SVB.

Figure 10C:
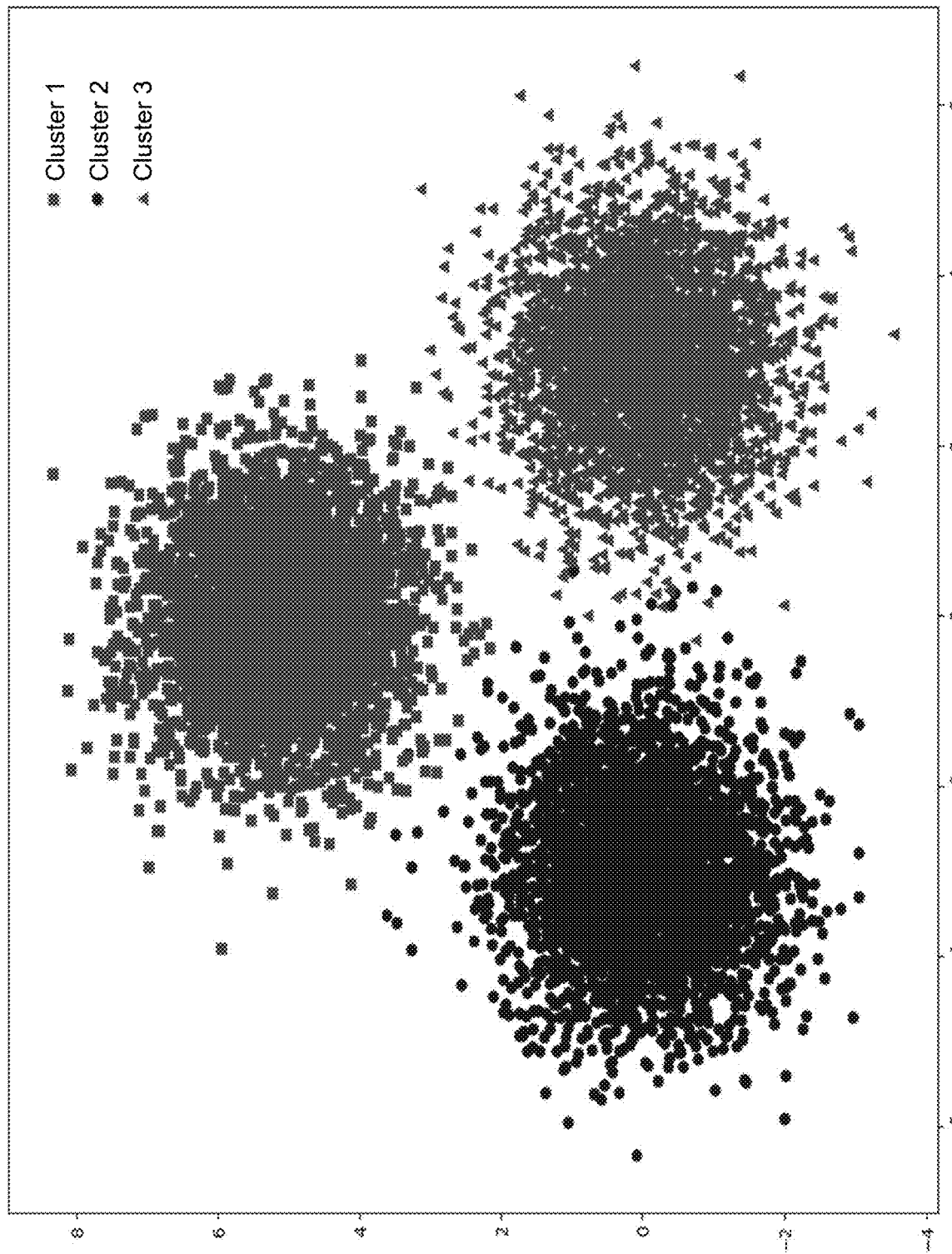
FIG. 10C shows a cluster assignment for the first sample dataset using the operations of FIGS. 2A and 2B in accordance with an illustrative embodiment.

Referring to FIG. 10C, a cluster assignment is shown for the three clusters using the operations of FIGS. 2A and 2B with the percentage value p=0.1 and the number of observations value $N_b$=1000. The accuracy achieved was 97.2%, which is very good.

Table 1 below shows the clustering accuracy with respect to different batch sizes using clustering model training application 422. The batch size is defined by their proportion in the original data, where 100% means that the entire dataset is used each iteration such that stochastic selection of the batch is not used.

TABLE 1

| Batch size (%) | 100% | 20% | 10% | 5% |
|---|---|---|---|---|
| Clustering accuracy (%) | 99.3% | 98.5% | 97.7% | 95.3% |
| Clustering time (seconds) | 4.01 | 1.07 | 0.65 | 0.43 |

As shown in Table 1, as the batch size decreases, the clustering accuracy remains good while the computation time decreases significantly.

Figure 11:
FIG. 11 shows a map used to define a second sample dataset in accordance with an illustrative embodiment.
Figure 12A:
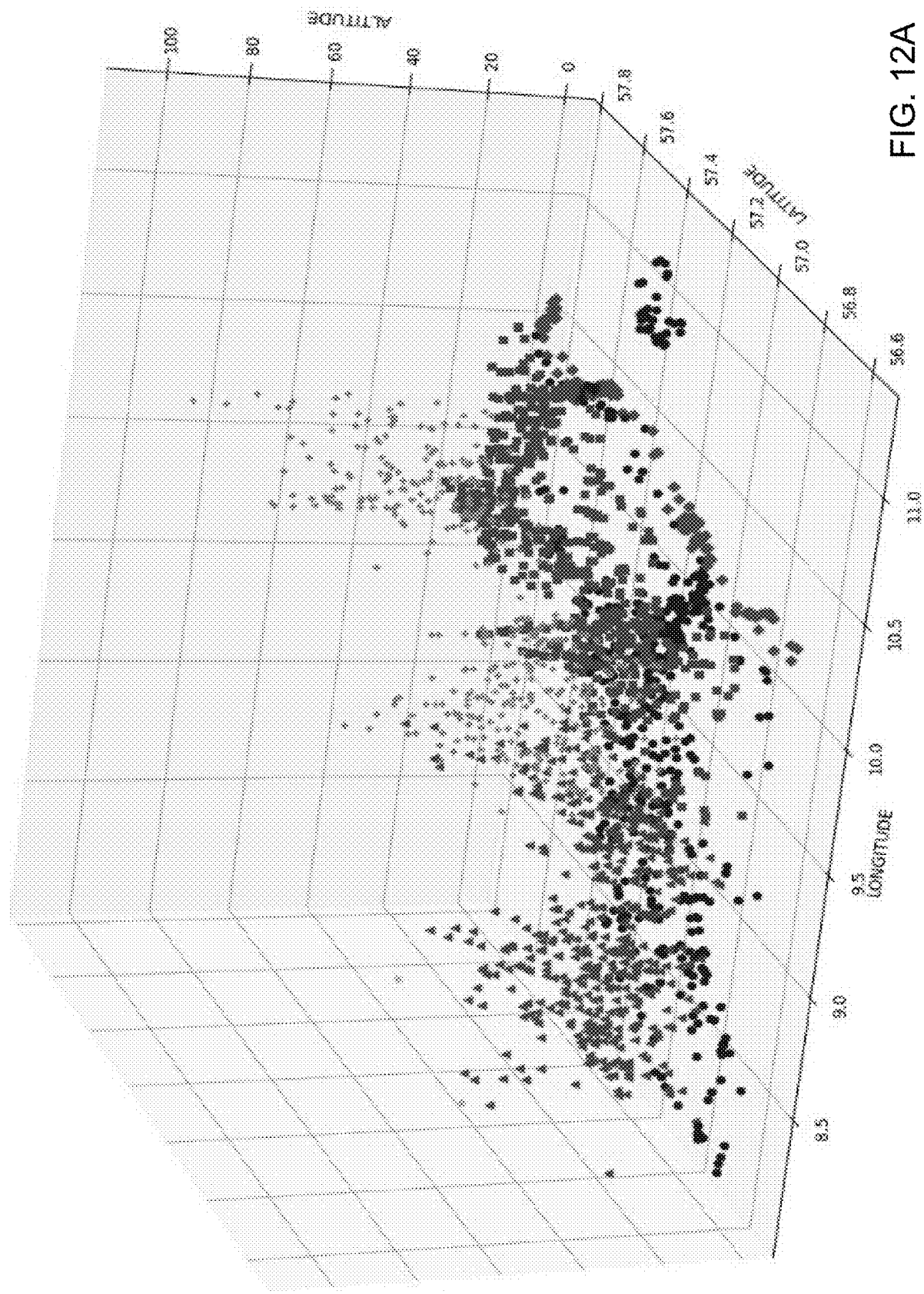
FIG. 12A shows clusters computed from the second sample dataset using the operations of FIGS. 2A and 2B in accordance with an illustrative embodiment.

For a second experiment, input dataset 124 included a large dataset of road statistics data for a northern part of Denmark shown referring to FIG. 11. Input dataset 124 included 434,874 rows. The features location information includes a longitude, a latitude, and an altitude for each feature. Referring to FIG. 12A, a cluster assignment is shown for the Denmark map data using clustering model training application 422 with the number of observations value $N_b$=20,000. The clustering results incorporated all of the three location features and show reasonable clusters. For example, the island each of the mainland is clearly visible. The clusters show a possible aggregation of road segments based on the longitude, the latitude, and the altitude. For example, a red cluster shows a cluster of roads located at a southwestern part and with a relatively high altitude; a blue cluster shows a cluster of roads at lower altitudes; a violet cluster shows roads located on an east coast; cyan and green clusters represent roads located north, but differentiated by their altitudes.

Figure 12B:
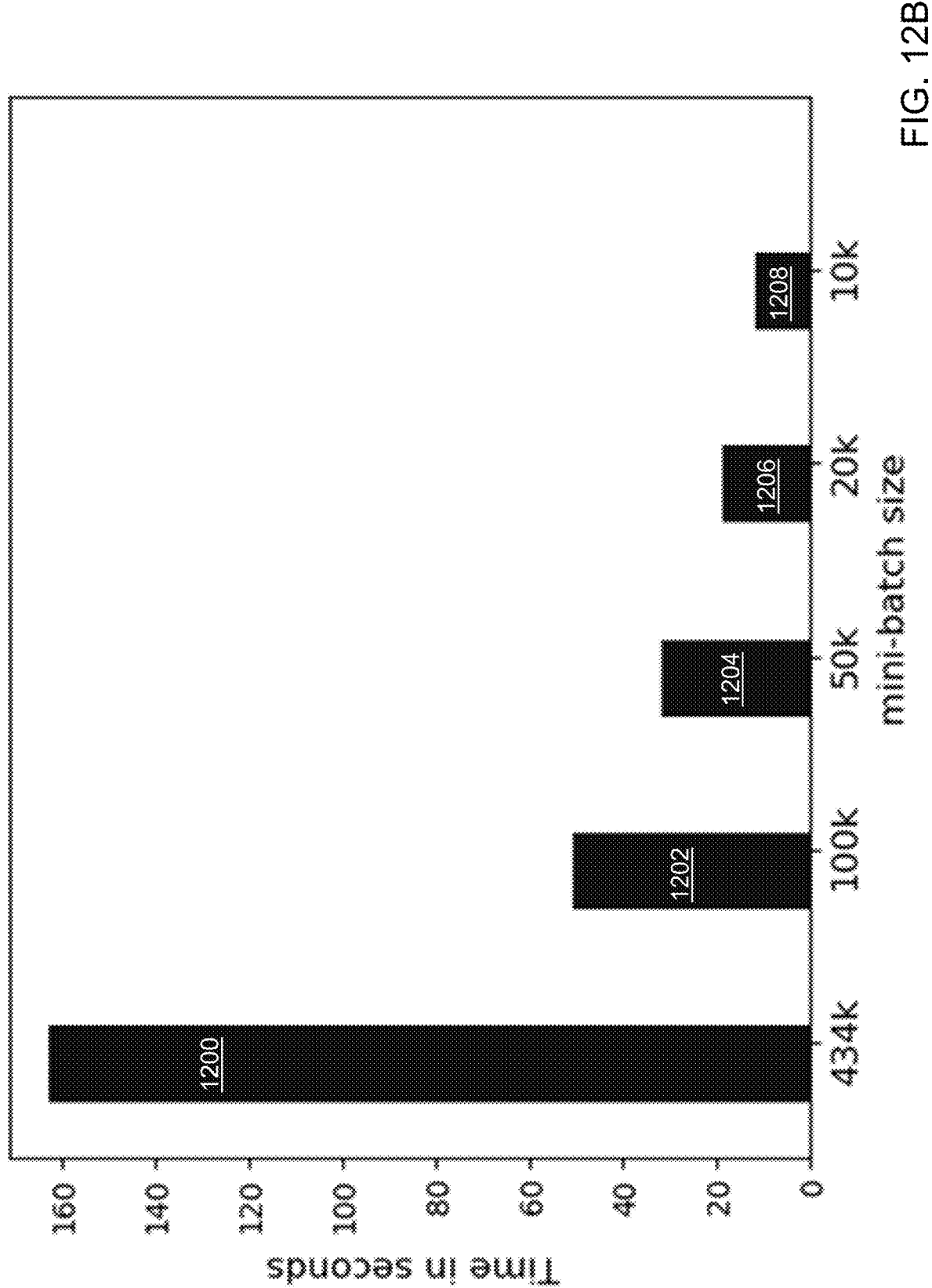
FIG. 12B shows a clustering time for 100 iterations of operation 842 of FIG. 8B using a dataset that included 10 million observations with ten variables in accordance with an illustrative embodiment.

Clustering model training application 422 was executed using five different batch sizes. Referring to FIG. 12B, A first histogram bar 1200 shows a batch size of the number of observations value $N_b$=434,874 that includes the entire map dataset. A second histogram bar 1202 shows a batch size of the number of observations value $N_b$=100,000. A third histogram bar 1204 shows a batch size of the number of observations value $N_b$=50,000. A fourth histogram bar 1206 shows a batch size of the number of observations value $N_b$=20,000. A fifth histogram bar 1208 shows a batch size of the number of observations value $N_b$=10,000.

A computing grid with 100 machines was used making the local batch size on each machine, $N_{bl}$=1,000, $N_{bl}$=500, $N_{bl}$=200, and $N_{bl}$=100, for single threading. The processing time decreases further when a plurality of threads is used. The speed-up shows a linear improvement because the calculation of $r_{i,k}$ is reduced linearly and is a major part of the calculation of the inference.

Figure 13:
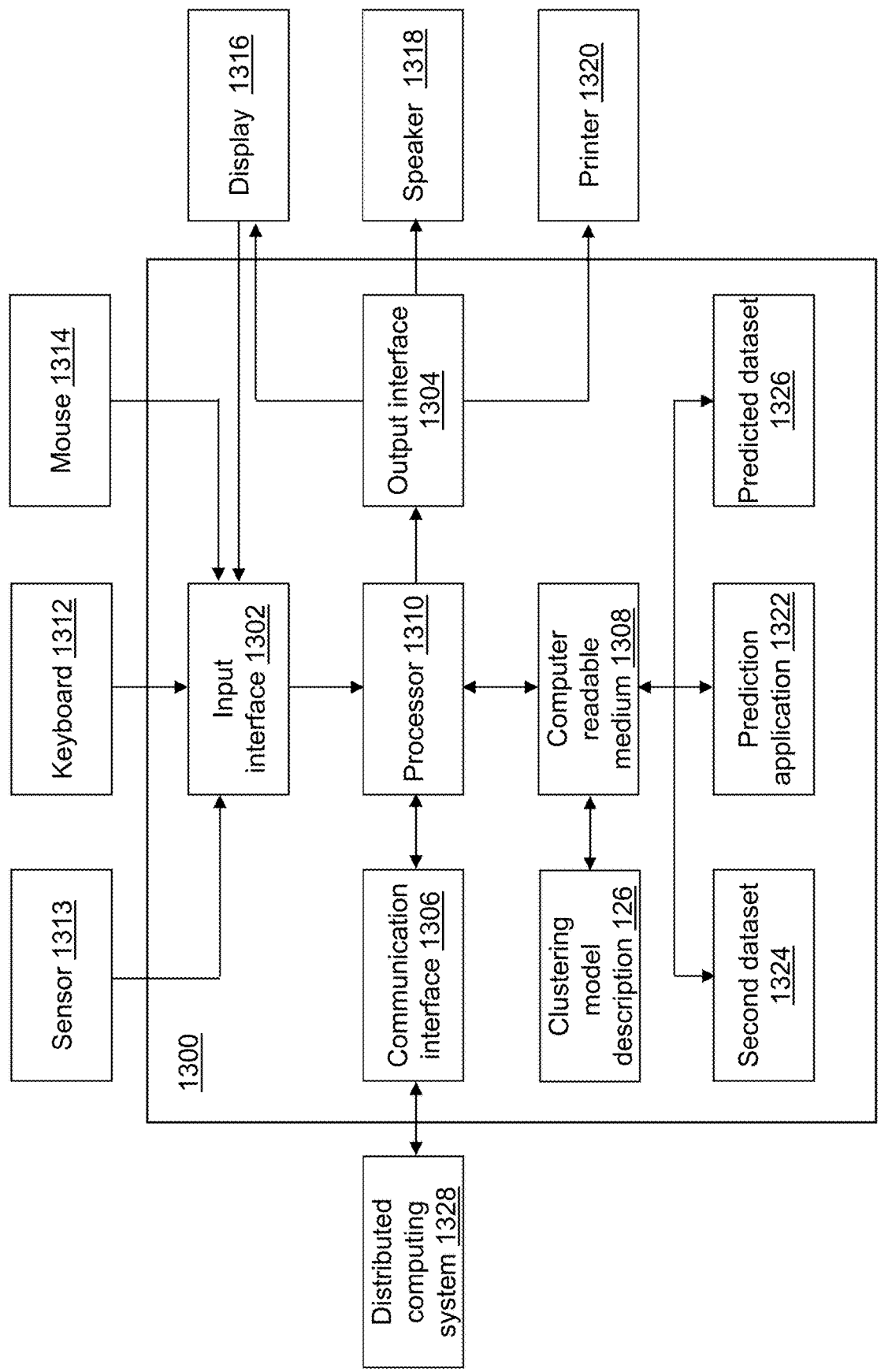
FIG. 13 depicts a block diagram of a prediction device in accordance with an illustrative embodiment.

Referring to FIG. 13, a block diagram of a prediction device 1300 is shown in accordance with an illustrative embodiment. Prediction device 1300 may include a fifth input interface 1302, a fifth output interface 1304, a fifth communication interface 1306, a fifth non-transitory computer-readable medium 1308, a fifth processor 1310, a prediction application 1322, clustering model description 126, second dataset 1324, and predicted dataset 1326. Fewer, different, and/or additional components may be incorporated into prediction device 1300. Prediction device 1300 and user device 400 and/or controller device 304 and/or clustering model training device 100 may be the same or different devices.

Fifth input interface 1302 provides the same or similar functionality as that described with reference to input interface 102 of clustering model training device 100 though referring to prediction device 1300. Fifth output interface 1304 provides the same or similar functionality as that described with reference to output interface 104 of clustering model training device 100 though referring to prediction device 1300. Fifth communication interface 1306 provides the same or similar functionality as that described with reference to communication interface 106 of clustering model training device 100 though referring to prediction device 1300. Data and messages may be transferred between prediction device 1300 and a distributed computing system 1328 using fifth communication interface 1306. Fifth computer-readable medium 1308 provides the same or similar functionality as that described with reference to computer-readable medium 108 of clustering model training device 100 though referring to prediction device 1300. Fifth processor 1310 provides the same or similar functionality as that described with reference to processor 110 of clustering model training device 100 though referring to prediction device 1300.

Prediction application 1322 performs operations associated with classifying or predicting a cluster membership of each observation vector included in second dataset 1324. The cluster membership may be stored in predicted dataset 1326 to support various data analysis functions as well as provide alert/messaging related to the classified/predicted data. Dependent on the type of data stored in input dataset 124 (input data subset 514 and/or input data subset 614) and second dataset 1324, prediction application 1322 may identify anomalies as part of process control, for example, of a manufacturing process, for machine condition monitoring, for image classification, for intrusion detection, for fraud detection, etc. Some or all of the operations described herein may be embodied in prediction application 1322. The operations may be implemented using hardware, firmware, software, or any combination of these methods.

Referring to the example embodiment of FIG. 13, prediction application 1322 is implemented in software (comprised of computer-readable and/or computer-executable instructions) stored in fifth computer-readable medium 1308 and accessible by fifth processor 1310 for execution of the instructions that embody the operations of prediction application 1322. Prediction application 1322 may be written using one or more programming languages, assembly languages, scripting languages, etc. Prediction application 1322 may be integrated with other analytic tools. As an example, prediction application 1322 may be part of an integrated data analytics software application and/or software architecture such as that offered by SAS Institute Inc. of Cary, N.C., USA. For example, prediction application 1322 may be part of SAS® Enterprise Miner™ developed and provided by SAS Institute Inc. of Cary, N.C., USA. Merely for further illustration, prediction application 1322 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. One or more operations of prediction application 1322 further may be performed by an ESPE. Prediction application 1322, clustering model training application 122, clustering model training application 422, controller application 512, and/or worker application 612 may be the same or different applications that are integrated in various manners to execute a clustering model using input dataset 124 that may be distributed (input data subset 514 and/or input data subset 614) and/or second dataset 1324.

Prediction application 1322 may be implemented as a Web application. Prediction application 1322 may be integrated with other system processing tools to automatically process data generated as part of operation of an enterprise, to classify data in the processed data, and/or to provide a warning or alert associated with the data classification using fifth input interface 1302, fifth output interface 1304, and/or fifth communication interface 1306 so that appropriate action can be initiated in response. For example, a warning or an alert may be presented using a third display 1316, a third speaker 1318, a third printer 1320, etc. or sent to one or more computer-readable media, display, speaker, printer, etc. of distributed computing system 1328.

Input dataset 124 and second dataset 1324 may be generated, stored, and accessed using the same or different mechanisms. Similar to input dataset 124, second dataset 1324 may include a plurality of rows and a plurality of columns with the plurality of rows referred to as observations or records, and the columns referred to as variables that are associated with an observation. Second dataset 1324 may be transposed.

Similar to input dataset 124, second dataset 1324 may be stored on fifth computer-readable medium 1308 or on one or more computer-readable media of distributed computing system 1328 and accessed by prediction device 1300 using fifth communication interface 1306. Data stored in second dataset 1324 may be a sensor measurement or a data communication value, for example, from a sensor 1313, may be generated or captured in response to occurrence of an event or a transaction, generated by a device such as in response to an interaction by a user with the device, for example, from a third keyboard 1312 or a third mouse 1314, etc. The data stored in second dataset 1324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1324 may be captured at different time points periodically, intermittently, when an event occurs, etc. One or more columns may include a time value. Similar to input dataset 124, data stored in second dataset 1324 may be generated as part of the IoT, and some or all data may be pre- or post-processed by an ESPE.

Similar to input dataset 124, second dataset 1324 may be stored in various compressed formats such as a coordinate format, a compressed sparse column format, a compressed sparse row format, etc. Second dataset 1324 further may be stored using various structures as known to those skilled in the art including a file system, a relational database, a system of tables, a structured query language database, etc. on prediction device 1300 and/or on distributed computing system 1328. Prediction device 1300 and/or distributed computing system 1328 may coordinate access to second dataset 1324 that is distributed across a plurality of computing devices that make up distributed computing system 1328. For example, second dataset 1324 may be stored in a cube distributed across a grid of computers as understood by a person of skill in the art. As another example, second dataset 1324 may be stored in a multi-node Hadoop® cluster. As another example, second dataset 1324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1324.

Figure 14:
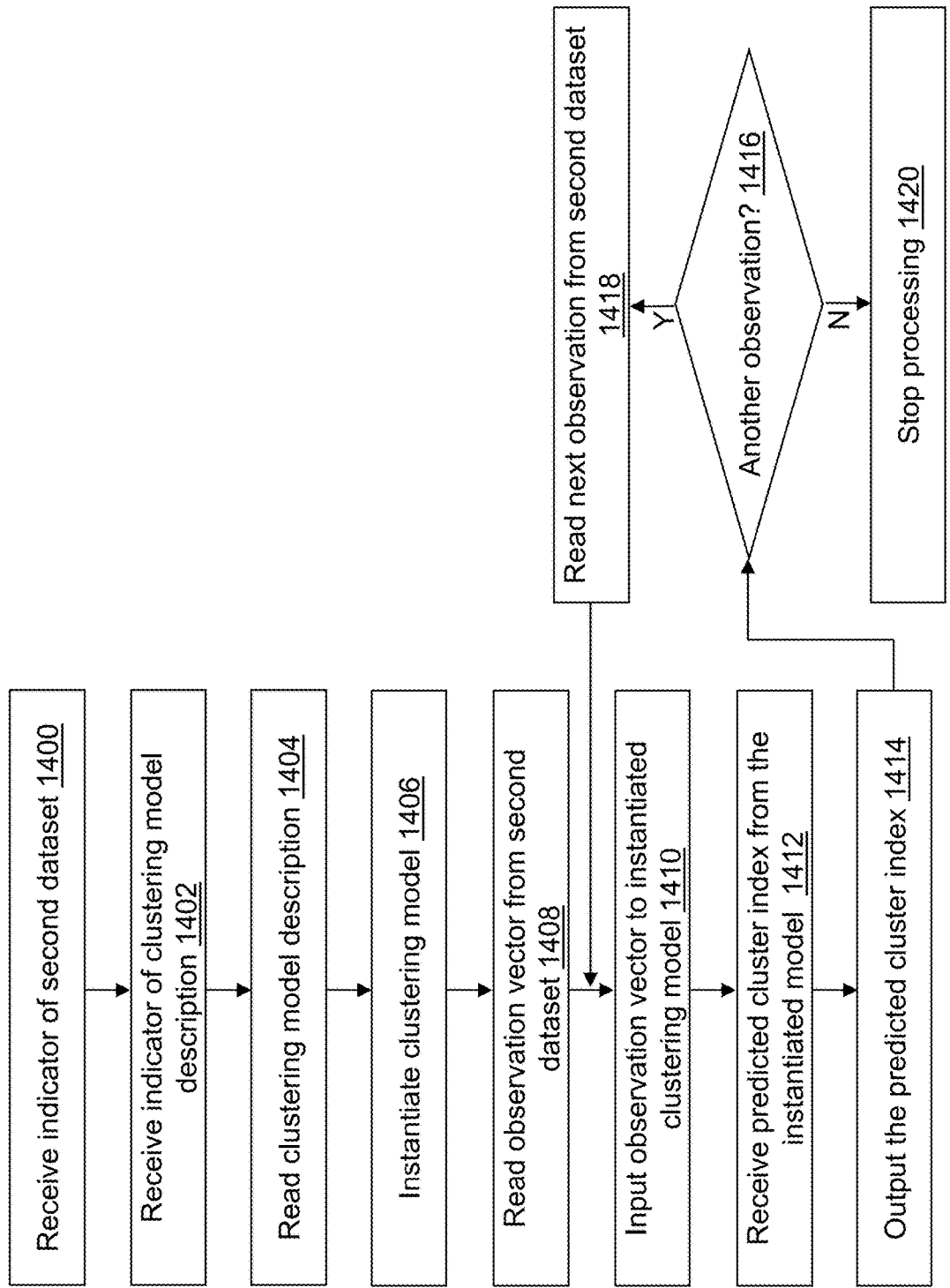
FIG. 14 depicts a flow diagram illustrating examples of operations performed by the prediction device of FIG. 13 in accordance with an illustrative embodiment.

Referring to FIG. 14, example operations of prediction application 1322 are described. Additional, fewer, or different operations may be performed depending on the embodiment of prediction application 1322. The order of presentation of the operations of FIG. 14 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1400, a fourteenth indicator may be received that indicates second dataset 1324. For example, the fourteenth indicator indicates a location and a name of second dataset 1324. As an example, the fourteenth indicator may be received by prediction application 1322 after selection from a user interface window or after entry by a user into a user interface window. In an alternative embodiment, second dataset 1324 may not be selectable. For example, a most recently created dataset may be used automatically.

In an operation 1402, a fifteenth indicator may be received that indicates clustering model description 126. For example, the fourteenth indicator indicates a location and a name of clustering model description 126. As an example, the fourteenth indicator may be received by prediction application 1322 after selection from a user interface window or after entry by a user into a user interface window. In an alternative embodiment, clustering model description 126 may not be selectable. For example, a most recently created model configuration data may be used automatically. As another example, clustering model description 126 may be provided automatically as part of integration with clustering model training application 122, clustering model training application 422, controller application 512, and/or worker application 612.

In an operation 1404, a clustering model description is read from clustering model description 126.

In an operation 1406, a clustering model is instantiated with the clustering model description. For example, the type of model, its hyperparameters, and other characterizing elements are read and used to instantiate a clustering model based on the information output from the training process in operation 266 or operation 858.

In an operation 1408, an observation vector is read from second dataset 1324.

In an operation 1410, the observation vector is input to the instantiated model.

In an operation 1412, a predicted cluster index for the read observation vector is received as an output of the instantiated model. The output may indicate a probability that the observation vector is assigned to each cluster. For illustration, the predicted cluster index and/or the probability may be computed based on a comparison of the observation vector with the $m_k$ and $\Psi_k$ computed for each cluster k=1, 2, . . . , $K_n$ of the number of clusters $K_n$ or from $\Psi$.

In an operation 1414, the predicted cluster index may be output, for example, by storing the predicted cluster index with the observation vector to predicted dataset 1326. In addition, or in the alternative, the predicted cluster index may be presented on third display 1316, printed on third printer 1320, sent to another computing device using fifth communication interface 1306, an alarm or other alert signal may be sounded through third speaker 1318, etc.

In an operation 1416, a determination is made concerning whether or not second dataset 1324 includes another observation vector. When second dataset 1324 includes another observation vector, processing continues in an operation 1418. When second dataset 1324 does not include another observation vector, processing continues in an operation 1420.

In operation 1418, a next observation vector is read from second dataset 1324, and processing continues in operation 1410.

In operation 1420, processing stops and cleanup is performed as needed.

There are applications for clustering model training application 122, clustering model training application 422, controller application 512, worker application 612, and/or prediction application 1322 in many areas such as process control and equipment health monitoring, image processing and classification, data segmentation, data analysis, etc. Clustering model training application 422, controller application 512, and worker application 612 provide efficient distributed and parallel computing device implementations for training clustering models. The presented results demonstrate improved or comparable model accuracies with significantly faster computing times.

The explosion of digital data is generating many opportunities for big data analytics, which in turn provides many opportunities for training clustering models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

compute a mean vector from a plurality of observation vectors, wherein each observation vector of the plurality of observation vectors includes a value for each variable of a plurality of variables;

compute an inverse precision matrix from the plurality of observation vectors;

initialize a responsibility parameter vector for each observation vector of the plurality of observation vectors, wherein the responsibility parameter vector includes a probability value of a cluster membership in each cluster of a plurality of clusters for each respective observation vector of the plurality of observation vectors;

(A) compute beta distribution parameter values for each cluster using a predefined mass parameter value and the responsibility parameter vector for each observation vector of the plurality of observation vectors;

(B) randomly select a batch of observation vectors from the plurality of observation vectors, wherein a batch number of the plurality of observation vectors included in the selected batch is a predefined batch size parameter value, wherein the predefined batch size parameter value is less than a number of observation vectors included in the plurality of observation vectors;

(C) compute parameter values for a normal-Wishart distribution using a predefined concentration parameter value, a predefined degree of freedom parameter value, the computed mean vector, the computed inverse precision matrix, the selected batch of observation vectors, and the responsibility parameter vector defined for each observation vector included in the selected batch of observation vectors;

(D) update each responsibility parameter vector defined for each observation vector of the selected batch of observation vectors using the computed beta distribution parameter values, the computed parameter values for the normal-Wishart distribution, and a respective observation vector of the selected batch of observation vectors;

(E) compute a convergence parameter value using each updated responsibility parameter vector or using an iteration counter of a number of iterations of (A);

(F) train a clustering model by repeating (A) to (E) until the computed convergence parameter value indicates the updated responsibility parameter vector defined for each observation vector is converged;

update each responsibility parameter vector defined for each observation vector of the plurality of observation vectors using the computed beta distribution parameter values and the computed parameter values for the normal-Wishart distribution;

assign each observation vector of the plurality of observation vectors to a cluster of the plurality of clusters using the probability value of the cluster membership in each cluster of the plurality of clusters included in a respective, updated responsibility parameter vector; and output the assigned cluster for each observation vector of the plurality of observation vectors.

2. The non-transitory computer-readable medium of claim 1, wherein computing the mean value and the inverse precision matrix comprises:
  randomly selecting an initialization batch of the plurality of observation vectors using the predefined batch size parameter value;
  computing the mean vector from the initialization batch of the plurality of observation vectors; and
  computing the inverse precision matrix using the mean vector computed from the initialization batch of the plurality of observation vectors.

3. The non-transitory computer-readable medium of claim 2, wherein the inverse precision matrix is computed using $$\Psi_0^{-1} = \frac{1}{N_b - 1} \sum_{i=l_1}^{l_{N_b}} (x_i - m_0)(x_i - m_0)^\top,$$

where $N_b$ is the predefined batch size parameter value, $x_i$ is an $i^{th}$ observation vector of the initialization batch, $m_0$ is the computed mean vector, l is an index list that stores an index for each observation vector included in the initialization batch of the plurality of observation vectors relative to the plurality of observation vectors, and $\tau$ indicates a transpose.

4. The non-transitory computer-readable medium of claim 1, wherein after assigning each observation vector to the cluster, the computer-readable instructions further cause the computing device to:
  determine a number of clusters of the plurality of clusters that include at least one observation vector; and
  output the determined number of clusters.

5. The non-transitory computer-readable medium of claim 1, wherein the inverse precision matrix is computed using $$\Psi_0^{-1} = \frac{1}{n-1} \sum_{i=1}^{n} (x_i - m_0)(x_i - m_0)^\top,$$

where $\Psi_0^{-1}$ is the inverse precision matrix, $x_i$ is an $i^{th}$ observation vector of the plurality of observation vectors, $m_0$ is the computed mean vector, n is a number of the plurality of observation vectors, and $\tau$ indicates a transpose.

6. The non-transitory computer-readable medium of claim 1, wherein the responsibility parameter vector is initialized for each observation vector using random draws from a multinomial distribution such that $\Sigma_{k=1}^{K_{max}} r_{i,k} = 1$ for i=1, 2, ..., n, where $r_{i,k}$ is a responsibility parameter value for an $i^{th}$ observation vector of the plurality of observation vectors and a $k^{th}$ cluster of the plurality of clusters, n is a number of the plurality of observation vectors, and $K_{max}$ is a number of the plurality of clusters.

7. The non-transitory computer-readable medium of claim 1, wherein the responsibility parameter vector is initialized using $\Sigma_{k=1}^{K_{max}} r_{i,k} = 1/K_{max}$ for i=1, 2, ..., n, where $r_{i,k}$ is a responsibility parameter value for an $i^{th}$ observation vector of the plurality of observation vectors and a $k^{th}$ cluster of the plurality of clusters, n is a number of the plurality of observation vectors, and $K_{max}$ is a number of the plurality of clusters.

8. The non-transitory computer-readable medium of claim 1, wherein the beta distribution parameter values include a first beta distribution parameter value, wherein the first beta distribution parameter value is computed using $\gamma_{k,1} = 1 + \Sigma_{i=1}^{n} r_{i,k}$ for k=1, 2, ..., $K_{max}$, where $\gamma_{k,1}$ is the first beta distribution parameter value for a $k^{th}$ cluster of the plurality of clusters, $r_{i,k}$ is a responsibility parameter value of the responsibility parameter vector defined for an $i^{th}$ observation vector of the plurality of observation vectors and the $k^{th}$ cluster of the plurality of clusters, $K_{max}$ is a number of the plurality of clusters, and n is a number of the plurality of observation vectors.

9. The non-transitory computer-readable medium of claim 8, wherein the beta distribution parameter values further include a second beta distribution parameter value, wherein the second beta distribution parameter value is computed using $\gamma_{k,2} = \alpha_0 + \Sigma_{l=k+1}^{K_{max}} \Sigma_{i=1}^{n} r_{i,l}$ for k=1, 2, ..., $K_{max}$, where $\gamma_{k,2}$ is the second beta distribution parameter value for a $k^{th}$ cluster of the plurality of clusters, and $\alpha_0$ is the predefined mass parameter value.

10. The non-transitory computer-readable medium of claim 1, wherein computing the parameter values for the normal-Wishart distribution comprises:
  computing a first parameter vector for the normal-Wishart distribution for each cluster using the predefined concentration parameter value, the computed mean vector, the selected batch of observation vectors, and the responsibility parameter vector for each observation vector of the batch of observation vectors;

computing a second parameter value for the normal-Wishart distribution for each cluster using the predefined concentration parameter value and the responsibility parameter vector for each observation vector of the batch of observation vectors;

computing a third parameter value for the normal-Wishart distribution for each cluster using the predefined degree of freedom parameter value and the responsibility parameter vector for each observation vector of the batch of observation vectors; and computing a fourth parameter matrix for the normal-Wishart distribution using the predefined concentration parameter value, the computed mean vector, the computed first parameter vector, the computed inverse precision matrix, the selected batch of observation vectors, and the responsibility parameter vector for each observation vector of the batch of observation vectors.

11. The non-transitory computer-readable medium of claim 10, wherein the first parameter value is computed using $$m_k = \frac{\beta_0 m_0 + \sum_{i=l_1}^{l_{N_b}} r_{i,k} x_i}{\beta_0 + \sum_{i=l_1}^{l_{N_b}} r_{i,k}}$$

for $k=1, 2, \ldots, K_{max}$, where $m_k$ is the first parameter vector for a $k^{th}$ cluster of the plurality of clusters, $\beta_0$ is the predefined concentration parameter value, $m_0$ is the computed mean vector, $r_{i,k}$ is a responsibility parameter value for an $i^{th}$ observation vector of the plurality of observation vectors and the $k^{th}$ cluster, $x_i$ is the $i^{th}$ observation vector of the plurality of observation vectors, l is an index list that stores an index for each observation vector included in the selected batch of observation vectors relative to the plurality of observation vectors, $N_b$ is the predefined batch size parameter value, and $K_{max}$ is a number of the plurality of clusters.

12. The non-transitory computer-readable medium of claim 10, wherein the second parameter value is computed using $$\beta_k = \beta_0 + \sum_{i=l_1}^{l_{N_b}} r_{i,k}$$

for $k=1, 2, \ldots, K_{max}$, where $\beta_k$ is the second parameter value for a $k^{th}$ cluster of the plurality of clusters, $\beta_0$ is the predefined concentration parameter value, $r_{i,k}$ is a responsibility parameter value for an $i^{th}$ observation vector of the plurality of observation vectors and the $k^{th}$ cluster, l is an index list that stores an index for each observation vector included in the selected batch of observation vectors relative to the plurality of observation vectors, $N_b$ is the predefined batch size parameter value, and $K_{max}$ is a number of the plurality of clusters.

13. The non-transitory computer-readable medium of claim 10, wherein the third parameter value for the normal-Wishart distribution is computed for each cluster.

14. The non-transitory computer-readable medium of claim 13, wherein the third parameter value is computed using $$v_k = v_0 + \sum_{i=l_1}^{l_{N_b}} r_{i,k}$$

for $k=1, 2, \ldots, K_{max}$, where $v_k$ is the third parameter value for a $k^{th}$ cluster of the plurality of clusters, $v_0$ is the predefined degree of freedom parameter value, $r_{i,k}$ is a responsibility parameter value for an $i^{th}$ observation vector of the plurality of observation vectors and the $k^{th}$ cluster, l is an index list that stores an index for each observation vector included in the selected batch of observation vectors relative to the plurality of observation vectors, $N_b$ is the predefined batch size parameter value, and $K_{max}$ is a number of the plurality of clusters.

15. The non-transitory computer-readable medium of claim 10, wherein the fourth parameter matrix for the normal-Wishart distribution is computed for each cluster.

16. The non-transitory computer-readable medium of claim 15, wherein the fourth parameter matrix is computed using $$\Psi_k = \left(\Psi_0^{-1} + \beta_0 (m_k - m_0)(m_k - m_0)^\top + \sum_{i=l_1}^{l_{N_b}} r_{i,k}(x_i - m_k)(x_i - m_k)^\top\right)^{-1},$$

for $k=1, 2, \ldots, K_{max}$, where $\Psi_k$ is the fourth parameter matrix for a $k^{th}$ cluster of the plurality of clusters, $\Psi_{0,j}^{-1}$ is the computed inverse precision matrix, $\beta_0$ is the predefined concentration parameter value, $m_k$ is the first parameter vector for the $k^{th}$ cluster of the plurality of clusters, $m_0$ is the computed mean vector, $r_{i,k}$ is a responsibility parameter value for an $i^{th}$ observation vector of the plurality of observation vectors and the $k^{th}$ cluster, $x_i$ is the $i^{th}$ observation vector of the plurality of observation vectors, l is an index list that stores an index for each observation vector included in the selected batch of observation vectors relative to the plurality of observation vectors, $N_b$ is the predefined batch size parameter value, $K_{max}$ is a number of the plurality of clusters, and $\tau$ indicates a transpose.

17. The non-transitory computer-readable medium of claim 10, wherein the third parameter value is computed using $$v_k = v_0 + \sum_{k=1}^{K_{max}} \sum_{i=l_1}^{l_{N_b}} r_{i,k}$$

where $v$ is the third parameter value, $v_0$ is the predefined degree of freedom parameter value, $r_{i,k}$ is a responsibility parameter value for an $i^{th}$ observation vector of the plurality of observation vectors and a $k^{th}$ cluster of the plurality of clusters, l is an index list that stores an index for each observation vector included in the selected batch of observation vectors relative to the plurality of observation vectors, $N_b$ is the predefined batch size parameter value, and $K_{max}$ is a number of the plurality of clusters.

18. The non-transitory computer-readable medium of claim 10, wherein the fourth parameter matrix is computed using $$\Psi_k = \left( \Psi_0^{-1} + \sum_{k=1}^{K_{max}} \beta_0(m_k - m_0)(m_k - m_0)^\top + \sum_{k=1}^{K_{max}} \sum_{i=l_1}^{l_{N_b}} r_{i,k}(x_i - m_k)(x_i - m_k)^\top \right)^{-1},$$

where $\Psi$ is the fourth parameter matrix, $\Psi_{0,j}^{-1}$ is the computed inverse precision matrix, $\beta_0$ is the predefined concentration parameter value, $m_k$ is the first parameter vector for a $k^{th}$ cluster of the plurality of clusters, $m_0$ is the computed mean vector, $r_{i,k}$ is a responsibility parameter value for an $i^{th}$ observation vector of the plurality of observation vectors and the $k^{th}$ cluster, $x_i$ is the $i^{th}$ observation vector of the plurality of observation vectors, l is an index list that stores an index for each observation vector included in the selected batch of observation vectors relative to the plurality of observation vectors, $N_b$ is the predefined batch size parameter value, $K_{max}$ is a number of the plurality of clusters, and $\tau$ indicates a transpose.

19. The non-transitory computer-readable medium of claim 10, wherein after assigning each observation vector to the cluster, the computer-readable instructions further cause the computing device to:
determine a number of clusters of the plurality of clusters that include at least one observation vector; and
output the determined number of clusters.

20. The non-transitory computer-readable medium of claim 19, wherein after determining the number of clusters, the computer-readable instructions further cause the computing device to:
output the first parameter vector and the fourth parameter matrix computed for each cluster that includes at least one observation vector.

21. The non-transitory computer-readable medium of claim 20, wherein, after determining the number of clusters, the computer-readable instructions further cause the computing device to:
read a new observation vector from a dataset;
assign the read new observation vector to a cluster of the determined number of clusters based on the read new observation vector, the first parameter vector, and the fourth parameter matrix computed for each cluster that includes at least one observation vector; and
output the assigned cluster.

22. The non-transitory computer-readable medium of claim 10, wherein the responsibility parameter vector is updated for each observation vector included in the selected batch of observation vectors using $$r_{i,k} \propto \exp\left( \Gamma^{(1)}(\gamma_{k,1}) - \Gamma^{(1)}(\gamma_{k,1} + \gamma_{k,2}) + \sum_{l=1}^{k-1} (\Gamma^{(1)}(\gamma_{l,2}) - \Gamma^{(1)}(\gamma_{l,1} + \gamma_{l,2})) + \frac{1}{2}\Gamma_d^{(1)}\left(\frac{v}{2}\right) + \frac{1}{2}\log|\Psi| - \frac{1}{2}(x_i - m_k)^\top v \Psi(x_i - m_k) - \frac{d}{2}\beta_k^{-1} \right)$$

for k=1, 2, ..., $K_{max}$, i=[$l_1$, ..., $l_{N_b}$], where $r_{i,k}$ is a responsibility parameter value for an $i^{th}$ observation vector of the plurality of observation vectors and a $k^{th}$ cluster of the plurality of clusters, $\gamma_{k,1}$ is a first beta distribution parameter value of the beta distribution parameter values for the $k^{th}$ cluster, $\gamma_{k,2}$ is a second beta distribution parameter value of the beta distribution parameter values for the $k^{th}$ cluster, $\gamma_{l,1}$ is the first beta distribution parameter value of the beta distribution parameter values for an $l^{th}$ cluster, $\gamma_{l,2}$ is the second beta distribution parameter value of the beta distribution parameter values for the $l^{th}$ cluster, $\Gamma^{(1)}$ indicates a digamma function, v is the third parameter value, $\Psi$ is the fourth parameter matrix, $m_k$ is the first parameter vector for the $k^{th}$ cluster, $x_i$ is the $i^{th}$ observation vector of the plurality of observation vectors, $\beta_k$ is the second parameter value for the $k^{th}$ cluster, l is an index list that stores an index for each observation vector included in the selected batch of observation vectors relative to the plurality of observation vectors, d is a number of the plurality of variables, $N_b$ is the predefined batch size parameter value, $K_{max}$ is a number of the plurality of clusters, and $\tau$ indicates a transpose.

23. The non-transitory computer-readable medium of claim 10, wherein the responsibility parameter vector is updated for each observation vector included in the selected batch of observation vectors using $$r_{i,k} \propto \exp\left( \Gamma^{(1)}(\gamma_{k,1}) - \Gamma^{(1)}(\gamma_{k,1} + \gamma_{k,2}) + \sum_{l=1}^{k-1} (\Gamma^{(1)}(\gamma_{l,2}) - \Gamma^{(1)}(\gamma_{l,1} + \gamma_{l,2})) + \frac{1}{2}\Gamma_d^{(1)}\left(\frac{v_k}{2}\right) + \frac{1}{2}\log|\Psi_k| - \frac{1}{2}(x_i - m_k)^\top v_k \Psi_k(x_i - m_k) - \frac{d}{2}\beta_k^{-1} \right)$$

for k=1, 2, ..., $K_{max}$, i=[$l_1$, ..., $l_{N_b}$], where $r_{i,k}$ is a responsibility parameter value for an $i^{th}$ observation vector of the plurality of observation vectors and a $k^{th}$ cluster of the plurality of clusters, $\gamma_{k,1}$ is a first beta distribution parameter value of the beta distribution parameter values for the $k^{th}$ cluster, $\gamma_{k,2}$ is a second beta distribution parameter value of the beta distribution parameter values for the $k^{th}$ cluster, $\gamma_{l,1}$ is the first beta distribution parameter value of the beta distribution parameter values for an $l^{th}$ cluster, $\gamma_{l,2}$ is the second beta distribution parameter value of the beta distribution parameter values for the $l^{th}$ cluster, $\Gamma^{(1)}$ indicates a digamma function, $v_k$ is the third parameter value for the $k^{th}$ cluster, $\Psi_k$ is the fourth parameter matrix for the $k^{th}$ cluster, $m_k$ is the first parameter vector for the $k^{th}$ cluster, $x_i$ is the $i^{th}$ observation vector of the plurality of observation vectors, $\beta_k$ is the second parameter value for the $k^{th}$ cluster, l is an index list that stores an index for each observation vector included in the selected batch of observation vectors relative to the plurality of observation vectors, d is a number of the plurality of variables, $N_b$ is the predefined batch size parameter value, $K_{max}$ is a number of the plurality of clusters, and $\tau$ indicates a transpose.

24. The non-transitory computer-readable medium of claim 1, wherein the plurality of observation vectors are distributed across a plurality of threads, and the responsibility parameter vector is initialized by each thread on which the plurality of observation vectors are distributed on each computing device of one or more computing devices.

25. The non-transitory computer-readable medium of claim 24, wherein the responsibility parameter vector is updated by each thread on which the plurality of observation vectors are distributed on each computing device of the one or more computing devices.

26. The non-transitory computer-readable medium of claim 25, wherein each thread computes $q_{k,w,t} = \sum_{i=1}^{n_{w,t}} r_{i,k}$, $u_{k,w,t} = \sum_{i=1}^{n_{w,t}} r_{i,k} x_i$, and $s_{k,w,t} = \sum_{i=1}^{n_{w,t}} r_{i,k} x_i x_i^\tau$ for each cluster k=1, . . . , $K_{max}$, where $n_{w,t}$ is a number of observation vectors included in the batch of observation vectors selected by a $w^{th}$ computing device and a $t^{th}$ thread of the $w^{th}$ computing device, $r_{i,k}$ is a responsibility parameter value for an $i^{th}$ observation vector and a $k^{th}$ cluster of the plurality of clusters, $x_i$ is the $i^{th}$ observation vector, $K_{max}$ is a number of the plurality of clusters, $q_{k,w,t}$ is a scalar value, $u_{k,w,t}$ is a vector, and $s_{k,w,t}$ is a matrix defined for the $k^{th}$ cluster, the $w^{th}$ computing device, and the $t^{th}$ thread of the $w^{th}$ computing device.

27. The non-transitory computer-readable medium of claim 25, wherein the cluster is assigned to each observation vector using a respective, updated responsibility parameter vector by each thread on which the plurality of observation vectors are distributed on each computing device of the one or more computing devices.

28. The non-transitory computer-readable medium of claim 4, wherein after determining the number of clusters, the computer-readable instructions further cause the computing device to:
   read a new observation vector from a dataset;
   assign the read new observation vector to a second cluster of the determined number of clusters based on the read new observation vector and the computed parameter values for the normal-Wishart distribution; and
   output the assigned cluster.

29. A system comprising:
   a processor; and
   a non-transitory computer-readable medium operably coupled to the processor, the non-transitory computer-readable medium having computer-readable instructions stored thereon that, when executed by the processor, cause the system to
      compute a mean vector from a plurality of observation vectors, wherein each observation vector of the plurality of observation vectors includes a value for each variable of a plurality of variables;
      compute an inverse precision matrix from the plurality of observation vectors;
      initialize a responsibility parameter vector for each observation vector of the plurality of observation vectors, wherein the responsibility parameter vector includes a probability value of a cluster membership in each cluster of a plurality of clusters for each respective observation vector of the plurality of observation vectors;
      (A) compute beta distribution parameter values for each cluster using a predefined mass parameter value and the responsibility parameter vector for each observation vector of the plurality of observation vectors;
      (B) randomly select a batch of observation vectors from the plurality of observation vectors, wherein a batch number of the plurality of observation vectors included in the selected batch is a predefined batch size parameter value, wherein the predefined batch size parameter value is less than a number of observation vectors included in the plurality of observation vectors;
      (C) compute parameter values for a normal-Wishart distribution using a predefined concentration parameter value, a predefined degree of freedom parameter value, the computed mean vector, the computed inverse precision matrix, the selected batch of observation vectors, and the responsibility parameter vector defined for each observation vector included in the selected batch of observation vectors;
      (D) update each responsibility parameter vector defined for each observation vector of the selected batch of observation vectors using the computed beta distribution parameter values, the computed parameter values for the normal-Wishart distribution, and a respective observation vector of the selected batch of observation vectors;
      (E) compute a convergence parameter value using each updated responsibility parameter vector or using an iteration counter of a number of iterations of (A);
      (F) train a clustering model by repeating (A) to (E) until the computed convergence parameter value indicates the updated responsibility parameter vector defined for each observation vector is converged;
      update each responsibility parameter vector defined for each observation vector of the plurality of observation vectors using the computed beta distribution parameter values and the computed parameter values for the normal-Wishart distribution;
      assign each observation vector of the plurality of observation vectors to a cluster of the plurality of clusters using the probability value of the cluster membership in each cluster of the plurality of clusters included in a respective, updated responsibility parameter vector; and
      output the assigned cluster for each observation vector of the plurality of observation vectors.

30. A method of training a clustering model, the method comprising:
   computing, by a computing device, a mean vector from a plurality of observation vectors, wherein each observation vector of the plurality of observation vectors includes a value for each variable of a plurality of variables;
   computing, by the computing device, an inverse precision matrix from the plurality of observation vectors;
   initializing, by the computing device, a responsibility parameter vector for each observation vector of the plurality of observation vectors, wherein the responsibility parameter vector includes a probability value of a cluster membership in each cluster of a plurality of clusters for each respective observation vector of the plurality of observation vectors;
   (A) computing, by the computing device, beta distribution parameter values for each cluster using a predefined mass parameter value and the responsibility parameter vector for each observation vector of the plurality of observation vectors;
   (B) randomly selecting, by the computing device, a batch of observation vectors from the plurality of observation vectors, wherein a batch number of the plurality of observation vectors included in the selected batch is a predefined batch size parameter value, wherein the predefined batch size parameter value is less than a number of observation vectors included in the plurality of observation vectors;
   (C) computing, by the computing device, parameter values for a normal-Wishart distribution using a predefined concentration parameter value, a predefined degree of freedom parameter value, the computed mean vector, the computed inverse precision matrix, the selected batch of observation vectors, and the responsibility parameter vector defined for each observation vector included in the selected batch of observation vectors;

(D) updating, by the computing device, each responsibility parameter vector defined for each observation vector of the selected batch of observation vectors using the computed beta distribution parameter values, the computed parameter values for the normal-Wishart distribution, and a respective observation vector of the selected batch of observation vectors;

(E) computing, by the computing device, a convergence parameter value using each updated responsibility parameter vector or using an iteration counter of a number of iterations of (A);

(F) training, by the computing device, a clustering model by repeating (A) to (E) until the computed convergence parameter value indicates the updated responsibility parameter vector defined for each observation vector is converged;

updating, by the computing device, each responsibility parameter vector defined for each observation vector of the plurality of observation vectors using the computed beta distribution parameter values and the computed parameter values for the normal-Wishart distribution;

assigning, by the computing device, each observation vector of the plurality of observation vectors to a cluster of the plurality of clusters using the probability value of the cluster membership in each cluster of the plurality of clusters included in a respective, updated responsibility parameter vector; and outputting, by the computing device, the assigned cluster for each observation vector of the plurality of observation vectors.

* * * * *